US012197604B2

(12) United States Patent
Garg et al.

(10) Patent No.: US 12,197,604 B2
(45) Date of Patent: Jan. 14, 2025

(54) CALCULATING AND REPORTING COLLABORATION SYSTEM RISKS

(71) Applicant: Box, Inc., Redwood City, CA (US)

(72) Inventors: Swati Garg, Santa Clara, CA (US);
Irina Issayeva, Foster City, CA (US);
Prachi Snehal, Belmont, CA (US);
Shilpa Varma, Mountain View, CA (US); James Lavine, Corte Madera, CA (US); David MacKenzie, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 293 days.

(21) Appl. No.: 17/561,153

(22) Filed: Dec. 23, 2021

(65) Prior Publication Data

US 2023/0205902 A1 Jun. 29, 2023

(51) Int. Cl.
*G06F 21/62* (2013.01)
*G06Q 10/101* (2023.01)

(52) U.S. Cl.
CPC ....... *G06F 21/6209* (2013.01); *G06Q 10/101* (2013.01); *G06F 2221/2101* (2013.01); *G06F 2221/2141* (2013.01)

(58) Field of Classification Search
CPC ............. H04L 67/1014; G06F 21/6209; G06F 2221/2101; G06F 2221/2141; G06Q 10/101
USPC .......................................................... 726/26
See application file for complete search history.

(56) References Cited

U.S. PATENT DOCUMENTS

| 10,922,282 | B2 | 2/2021 | Jalagam et al. | |
|---|---|---|---|---|
| 2013/0007207 | A1* | 1/2013 | Dietrich | G06F 16/183 709/217 |
| 2013/0339514 | A1* | 12/2013 | Crank | H04L 63/1408 709/224 |

(Continued)

OTHER PUBLICATIONS

"Check traffic and insights on shared files", Dropbox.com, dated Oct. 28, 2020 via Web Archive, URL: https://help.dropbox.com/files-folders/share/traffic-insights.

(Continued)

*Primary Examiner* — Meng Vang
(74) *Attorney, Agent, or Firm* — Vista IP Law Group, LLP

(57) ABSTRACT

Methods, systems, and computer program products for a content management system. Embodiments operate within or in conjunction with such a content management system. The content management system stores content objects for access by various collaborators, including extra-system collaborators. A user of the content management system configures extra-enterprise shared link URLs that permit the extra-system collaborators to access shared content objects over an Internet connection. A shared link event graph data structure is formed based on access requests over the extra-enterprise shared link URLs. An interactive user interface module is generated by processing a shared link report query over the shared link event graph data structure to select a subject set of the extra-enterprise shared link URLs, and to generate a data set of the interactive user interface module based at least in part on results from the query. A user interacts with the interactive user interface module to generate insights.

21 Claims, 17 Drawing Sheets

(56) References Cited

U.S. PATENT DOCUMENTS

| | | | | |
|---|---|---|---|---|
| 2014/0344953 | A1* | 11/2014 | Roundtree | G06F 21/10 |
| | | | | 726/28 |
| 2020/0081814 | A1* | 3/2020 | Srinivasan | G06F 8/71 |
| 2020/0302817 | A1* | 9/2020 | Williams | G09B 7/02 |
| 2021/0006592 | A1* | 1/2021 | Heyman | H04L 63/1483 |
| 2021/0224263 | A1 | 7/2021 | Srinivas et al. | |
| 2022/0321596 | A1* | 10/2022 | Weizman | H04L 63/1483 |

OTHER PUBLICATIONS

"File permissions for increased security", Dropbox.com, dated Nov. 29, 2018 via Web Archive, URL: https://www.dropbox.com/features/share/file-permissions.

"How SharePoint and OneDrive safeguard your data in the cloud", Microsoft.com, article dated Aug. 26, 2021, URL: https://docs.microsoft.com/en-us/sharepoint/safeguarding-your-data.

"Report on external sharing for Onedrive and Sharepoint Online", Microsoft.com, dated Jan. 12, 2021, URL: https://docs.microsoft.com/en-us/answers/questions/227909/report-on-external-sharing-for-onedrive-and-sharep.html.

"How do I see who's viewing my files?", Dropbox.com, dated Sep. 25, 2019 via Web Archive, URL: https://help.dropbox.com/files-folders/share/viewer-information.

"Report on file and folder sharing in a SharePoint site", Microsoft.com, article dated Aug. 26, 2021, URL: https://docs.microsoft.com/en-us/sharepoint/sharing-reports.

* cited by examiner

CALCULATING AND REPORTING COLLABORATION SYSTEM RISKS

TECHNICAL FIELD

This disclosure relates to collaboration systems, and more particularly to techniques for calculating and reporting collaboration system risks.

BACKGROUND

The emergence of content management systems has changed the way we create, share, modify, maintain, and dispose of electronic documents. Formerly, a first correspondent would share a document with a second correspondent by giving the other corresponding a copy of the document, and the first correspondent would expect the document to be returned with changes and/or comments. This process of passing around a document presented barriers to collaboration, at least in that, in accordance with such a copy-passing regime, changes to a particular document could only be made serially, i.e., by one collaborator at a time.

Content management systems have addressed the aforementioned barriers to collaboration by maintaining a single copy of an electronic document in a manner such that any number of collaborators can create, share, modify, maintain, and dispose of electronic documents at will and in parallel—at least in accordance with whatever roles and/or content object privileges had been pre-established. Such a sharing or collaboration regime has proven to work well within an enterprise where all collaborators are "trusted entities" and/or where all collaborators are subject to some certain set of legal bounds, and/or where all electronic documents of the enterprise are stored in locations that are under control of the enterprise.

In many situations however, collaborators in one enterprise might want to work with collaborators in another enterprise. Rather than make multiple copies of a document to be shared across enterprise boundaries, modern content management systems have introduced the notion of cross-enterprise shares, where a first collaborator (in a first enterprise) grants a second collaborator (in a second enterprise) access to a content object (e.g., file or folder). In this regime, a particular single instance of a particular electronic document is stored under control of the first enterprise while nevertheless granting certain access rights to the second collaborator in the second enterprise. The second collaborator can access the particular single instance of the particular electronic document over the Internet. Such an access grant, where the second collaborator can access the particular single instance of the particular shared electronic document over the Internet, introduces a great deal more vulnerability to malicious acts.

This situation becomes much more complicated when a particular collaborator shares the electronic document (e.g., by sharing a link to the electronic document) with another person who is not a registered user of the collaboration system. Such a sharing with another person who is not a registered user of the collaboration system not only makes the situation more complicated, it also introduces risk, at least to the extent that the information in the shared electronic document might be exposed to unknown persons.

As such, on an ongoing basis, administrators and other stakeholders of the first enterprise want to have an understanding of who (e.g., someone from the second enterprise, or someone posing as someone from the second enterprise, or someone who presents themselves as anonymous) has been accessing the particular shared electronic document. Unfortunately, there are no known techniques for vetting actions taken by on anonymous users (e.g., actions taken by anonymous users over a particular shared electronic document) to determine if the actions expose vulnerabilities and/or if such actions increase risks of data loss. Nor are there any known techniques for rendering threat assessments based on actions taken by anonymous users.

Addressing this situation becomes significantly more challenging when recognizing the sheer volume of information that might need to be considered to determine any particular action over any particular shared electronic document either exposes the aforementioned vulnerabilities and/or if any particular action increases the risk of data loss. That is, given the broad adoption of content management systems at enterprise levels, it often happens that many millions of shared documents might be subject to thousands or even tens of thousands of accesses, thus presenting the challenge of dealing with hundreds of millions or even billions of potentially threatening events.

Unfortunately, merely "dumping" details pertaining to hundreds of millions or even billions of potentially threatening events fails to aid human comprehension. Therefore, what is needed is a technique or techniques that address the problems that arise when presentation of document sharing events becomes human-incomprehensible and/or useless for making threat assessments pertaining to the underlying information stored in the collaboration system.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for calculating and reporting collaboration system risks, which techniques advance the relevant technologies to address technological issues with legacy approaches. More specifically, the present disclosure describes techniques used in systems, methods, and in computer program products for calculating and reporting collaboration system risks based on capture and analysis of events on shared objects. Certain embodiments are directed to technological solutions for distilling shared link events into an interactive threat assessment tool based on capture and analysis of events on shared objects.

The ordered combination of steps of the embodiments serve in the context of practical applications that perform steps for distilling sharing events into an interactive threat assessment tool based on capture and analysis of events on shared objects. As such, techniques for distilling sharing events into an interactive threat assessment tool based on capture and analysis of events on shared objects overcome long-standing yet heretofore unsolved technological problems associated with making threat assessments based on human analysis.

Many of the herein-disclosed embodiments for distilling sharing events into an interactive threat assessment tool based on capture and analysis of events on shared objects are technological solutions pertaining to technological problems that arise in the hardware and software arts that underlie collaboration systems. Aspects of the present disclosure achieve performance and other improvements in peripheral technical fields including, but not limited to, threat assessment and visual representation of "big data".

Some embodiments include a sequence of instructions that are stored on a non-transitory computer readable medium. Such a sequence of instructions, when stored in memory and executed by one or more processors, causes the one or more processors to perform a set of acts for distilling sharing events into an interactive threat assessment tool based on capture and analysis of events on shared objects.

Some embodiments include the aforementioned sequence of instructions that are stored in a memory, which memory is interfaced to one or more processors such that the one or more processors can execute the sequence of instructions to cause the one or more processors to implement acts for distilling sharing events into an interactive threat assessment tool based on capture and analysis of events on shared objects.

In various embodiments, any combinations of any of the above can be organized to perform any variation of acts for calculating and reporting collaboration system risks based on capture and analysis of events on shared objects, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
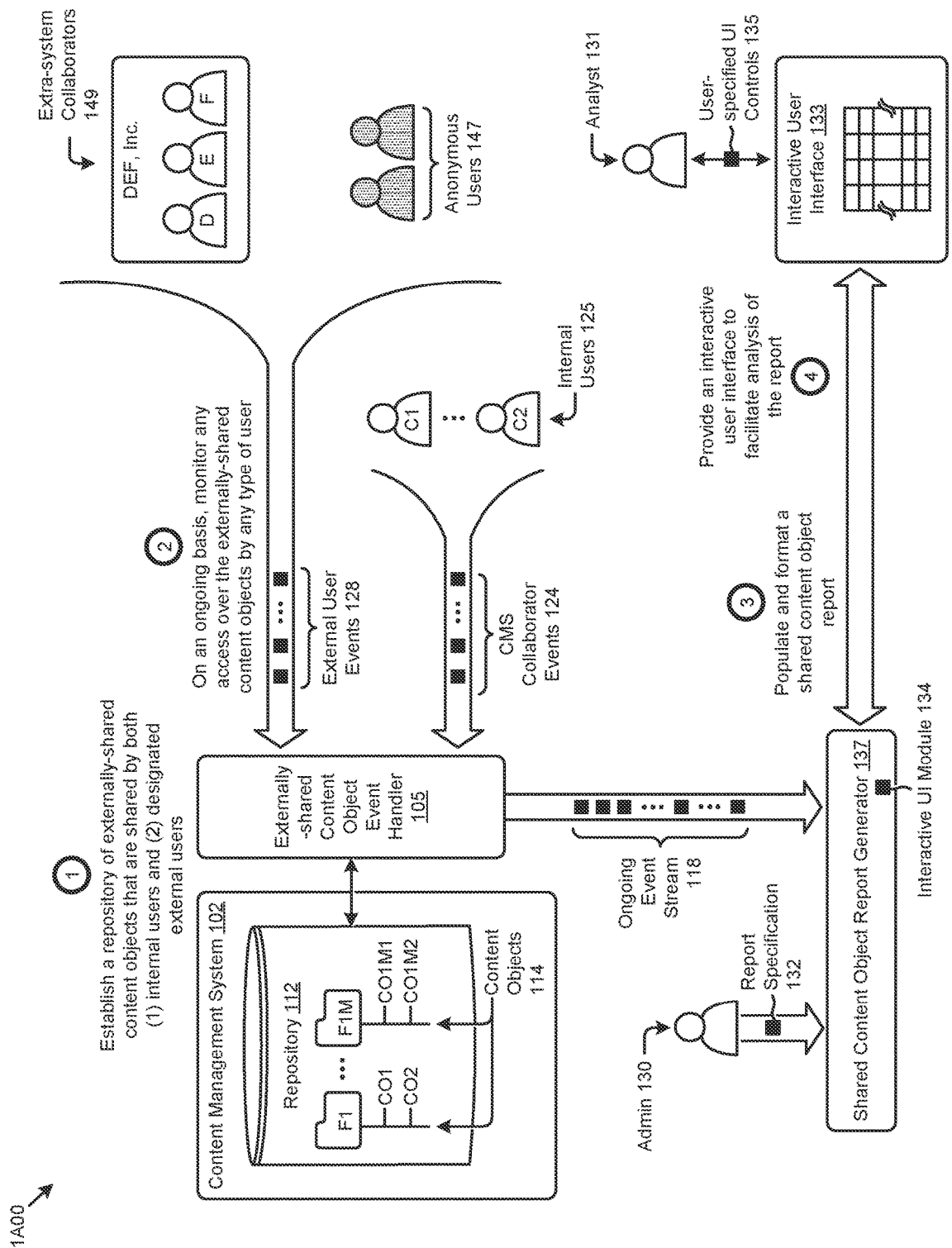
FIG. 1A exemplifies an environment in which the herein-disclosed techniques can be practiced.

Aspects of the present disclosure solve problems associated with using computer systems to form threat assessments based on human analysis of sharing events becomes incomprehensible as the number of sharing events increases. Some embodiments are directed to approaches for distilling sharing events into an interactive threat assessment tool based on capture and analysis of events on shared objects. The accompanying figures and discussions herein present example environments, systems, methods, and computer program products for calculating and reporting collaboration system risks based on capture and analysis of events on shared objects.

Overview

In some cases, a report that is organized to aid in human understanding of who has been accessing the particular cross-enterprise shared electronic documents could be generated by merely providing a listing of all of the cross-enterprise shared electronic documents together with corresponding accesses. For example, if a particular cross-enterprise shared electronic document had been accessed by only (for example) one collaborator from the first enterprise and one collaborator the second enterprise, then that cross-enterprise shared electronic document might be associated with (for example) just two access events. Such a report might contain just one row with the cross-enterprise shared electronic document identified in the first column, followed by as many columns as would be necessary to capture characteristics of the access events (e.g., times of accesses, IP address of the endpoint from which accesses were made, etc.). This report can be extended to include as many rows as there are cross-enterprise shared electronic documents and as many columns as would be necessary to capture characteristics of interest as may correspond to the access events. Such a report, while sufficient in some subset of sharing scenarios, becomes unwieldy in other situations. Moreover, such a report, while sufficient in some subset of threat assessment scenarios, might be insufficiently populated with attributes that pertain to anonymous users.

Strictly as examples, in modern content management systems, there may be many hundreds or even many hundreds of thousands of cross-enterprise shared electronic documents where each such document has a unique identifier (e.g., a uniform resource identifier (URI), a uniform resource locator (URL), a path name to a corresponding location in a hierarchical file organization, etc.). Another scenario where ongoing management becomes unwieldy is when the single copy of the cross-enterprise shared electronic document is permitted be moved around dynamically based on use patterns (e.g., based on user-directed movement of the shared content object, or based on system-directed movement of the shared content object, etc.).

As such, the density of information that might be found in a cross-enterprise shared electronic document (e.g., information pertaining to ongoing accesses) in combination with rapidly-changing shared object characteristics (e.g., changing locations, changing permissions, collaborator access events, etc.) means that such a cross-enterprise shared electronic document report becomes difficult for a human to comprehend. Merely "dumping" many thousands or hundreds of thousands of events into a file fails to aid human comprehension. Moreover, it is imperative to account for activities performed by anonymous users, at least inasmuch as malefactors, or even just snoopers, strongly seek out ways to access information anonymously.

One way to aid in human comprehension is to organize the report hierarchically. Another way is to only present changes that have occurred in a certain timeframe. Yet another way is to collapse a more granular timeframe into a less granular timeframe. Still another way to aid in human comprehension is to present the report in a manner that draws attention to occurrences that correlate to the highest threat levels.

Various techniques to aid in human cognition are presented herein. More specifically, one or more of the foregoing techniques can be applied to manipulate, combine, and otherwise transform data from one organization to another organization so as to present the transformed data in a manner that aids human comprehension.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies an environment in which the herein-disclosed techniques can be practiced. As an option, one or more variations of environment 1A00 or any aspect thereof may be implemented in the context of the architecture and functionality of the embodiments described herein and/or in any environment.

The figure is bring presented to illustrate how an interactive user interface (UI) can be populated with collaboration system data (e.g., events over content objects of the collaboration system). Moreover the figure is being presented to exemplify how extra-system collaborators 149 can employ user-specified UI controls 135 over interactive user interface 133 so as to interact with certain user-specified portions of the collaboration system data.

As shown, content management system 102 is configured to store instances of content objects 114 for access by (1) intra-system collaborators of the content management system (e.g., internal users 125 who are associated with corresponding user profiles within the content management system) and, (2) extra-system collaborators 149, which extra-system collaborators are associated with at least an alias (e.g., email alias, or handle, or screen name, or other alias).

Access to the aforementioned content objects can be provided to internal users based on roles and/or access privileges that correspond to their user profiles. In some situations an internal user might want to share a particular content object with a collaborator who is an external user and for whom there might not be any user profile, and/or for whom there might not be any assigned role or access privileges. In such a case the content management content system (CMS) can be configured to support such external user access.

Strictly as one possible scenario, an internal user (e.g., either user "C1" or user "C2") who is an employee of a first enterprise and who wants to negotiate a contract with employees "D", "E", and "F" of another enterprise (e.g., "DEF, Inc. 144) might want to give at least some form of access to the contract to employees "D", "E", and "F". This can be accomplished by providing employees "D", "E", and "F" with some means to access the corresponding content object (e.g., the contract document and/or its containing folder). Legacy techniques might send copies of the contract as attachments to each of employees "D", "E", and "F" with instructions on how to make modifications to the contract and how to send changed versions of the contract onward (or back) to the other collaborators. However, such legacy techniques involving passing around a document is severely limited, at least in that changes to a particular document can only be made serially, in other words, by one collaborator at a time.

Rather than passing around a document serially as between collaborators, the content management system of FIG. 1A is configured to manage extra-enterprise shared link URLs. Such extra-enterprise shared link URLs refer directly or indirectly to content objects 114. Mere knowledge of an extra-enterprise shared link URL permits extra-system users (e.g., users who are not identifiable as registered users of the CMS) to access certain of the content objects over the Internet. This is very convenient for extra-system collaborators, at least in that the extra-system collaborators do not have to pay for a subscription and/or otherwise sign up as a user of the collaboration system. On the other hand, techniques that involve access to unregistered or possibly anonymous users to the content objects (e.g., via the access provided by the extra-enterprise shared link URLs) exposes the content management system to security vulnerabilities, possibly including loss or misappropriation of information in the content objects 114 corresponding to the extra-enterprise shared link URLs.

To aid in management of such potential vulnerabilities and/or potential risks, the content management system is configured to be able, on an ongoing basis, to monitor accesses to the content objects, including accesses that originate from the extra-enterprise shared link URLs. More specifically, an event handler (e.g., the shown externally-shared content object event handler 105) is configured to gather, on an ongoing basis, occurrences of external user events 128, while at the same time, gathering occurrences of CMS collaborator events 124. Such ongoing monitoring might include creating a history of events by storing access requests as they occur.

In some cases incoming access requests might be labeled at the time of occurrence to capture the type of access requested and to capture the identity of the access requestor. In some cases it can happen that the identity of the access requestor is only known to a limited extent. For example, the identity or uniqueness of an access requestor might be known only by knowledge of the IP address path and/or an association with an IP address endpoint from which the access request had originated. In some cases the identity or uniqueness of an access requestor can be resolved to a particular enterprise (e.g., enterprise "DEF, Inc."). However in other situations, the identity or uniqueness of an access requestor cannot be resolved to a particular enterprise and, in such cases, those users who cannot be resolved to a particular enterprise are deemed to be anonymous users 147. Access to content objects of the content management system by anonymous users present heightened security risks. As such, conditions and/or other information that can be determined at the time of an anonymous user access are gathered and recorded for ongoing risk analysis.

As is known in the art, it often happens in content management systems, many millions of shared documents might be subject to thousands or even tens of thousands of accesses during the lifetime of the documents. Accordingly there needs to be a way to deal with hundreds of millions or even billions of potentially threatening events.

One way to deal with hundreds of millions or even billions of potentially threatening events is to gather such potentially threatening events into an organized report, which in turn can be analyzed (e.g., based on user-specified inquiries) to assess the extent of security vulnerabilities and/or specific security risks (e.g., potential loss of, or misappropriation of, information in the content objects). The foregoing organized report can be populated with tagged events that are selected from an ongoing event stream 118. An administrator 130 can provide a report specification 132, which report specification informs a shared content object report generator 137 such that an interactive UI module 134 can contain tagged events that correspond to the given report specification. Interactive UI module 134 can be formatted in a manner so as to facilitate presentation of events in an interactive user interface. Moreover, interactive UI module 134 might include data that is organized in a manner that facilitates presentation of certain sets of suspect events based on an analyst's (e.g., analyst 131) input of user-specified UI controls 135.

An interactive UI module 134 can be generated by (1) selecting a set of the extra-enterprise shared link URLs, (2) populating a data structure that correlates a series of access requests and (3) analyzing the series of access requests and/or other data that comprises the data structure to correlate individual ones of the selected extra-enterprise shared link URLs with specific ones of the series of access requests. By executing such an interactive UI module on a computer, an interactive user interface can be displayed on a computer screen. In exemplary cases, the interactive user interface includes one or more user input widgets that are interfaced to executable code modules that are in turn responsive to values that are input into the user interface screen devices. As one specific example, a first value that is input into a first user interface screen device can be used to determining a subset of the selected extra-enterprise shared link URLs to present in a user interface. As another example, a second value that is input into a second user interface screen device can be used by the interactive user interface to provide a view of a series of access requests. In exemplary cases, the view of the series of access requests can be based on a specific subset of selected extra-enterprise shared link URLs.

Continuous vigilance over threats and risks can be accomplished on an ongoing basis. With reference to the environment 1A00, once repository 112 has been established and configured in a manner that facilitates storage of content objects that are shared among both internal users and certain designated extra-system collaborators (operation 1), events over those shared content objects can be continually monitored (operation 2). Periodically, such events over those shared content objects can be gathered in accordance with a report specification, and populated into or added onto a data structure (operation 3). Also, periodically, an analyst can use a specially-constructed user interface (operation 4) to view and analyze certain events over those shared content objects (e.g., events that correspond to one or more user-manipulated UI controls 135). The analyst in turn might identify specific risks that may correspond to the analyzed events. In some cases, the analyst can cause un-sharing of a content object that corresponds to any one or more extra-enterprise shared link URLs. In some cases, the analyst can invoke a forensic investigation over the user or users who are associated with suspected leakage or suspected mis-appropriation of information corresponding to the suspect events. In some situations, the environment of FIG. 1A can be augmented to implement policies, policy violations, or even attempted violations of policies. The definitions and application of such policies can be tuned so as to identify particular types of suspicious events, some of which might be tuned to be able to identify a data leak. One possible implementation of a policy handler is shown and described as pertains to FIG. 1B.

Figure 1B:
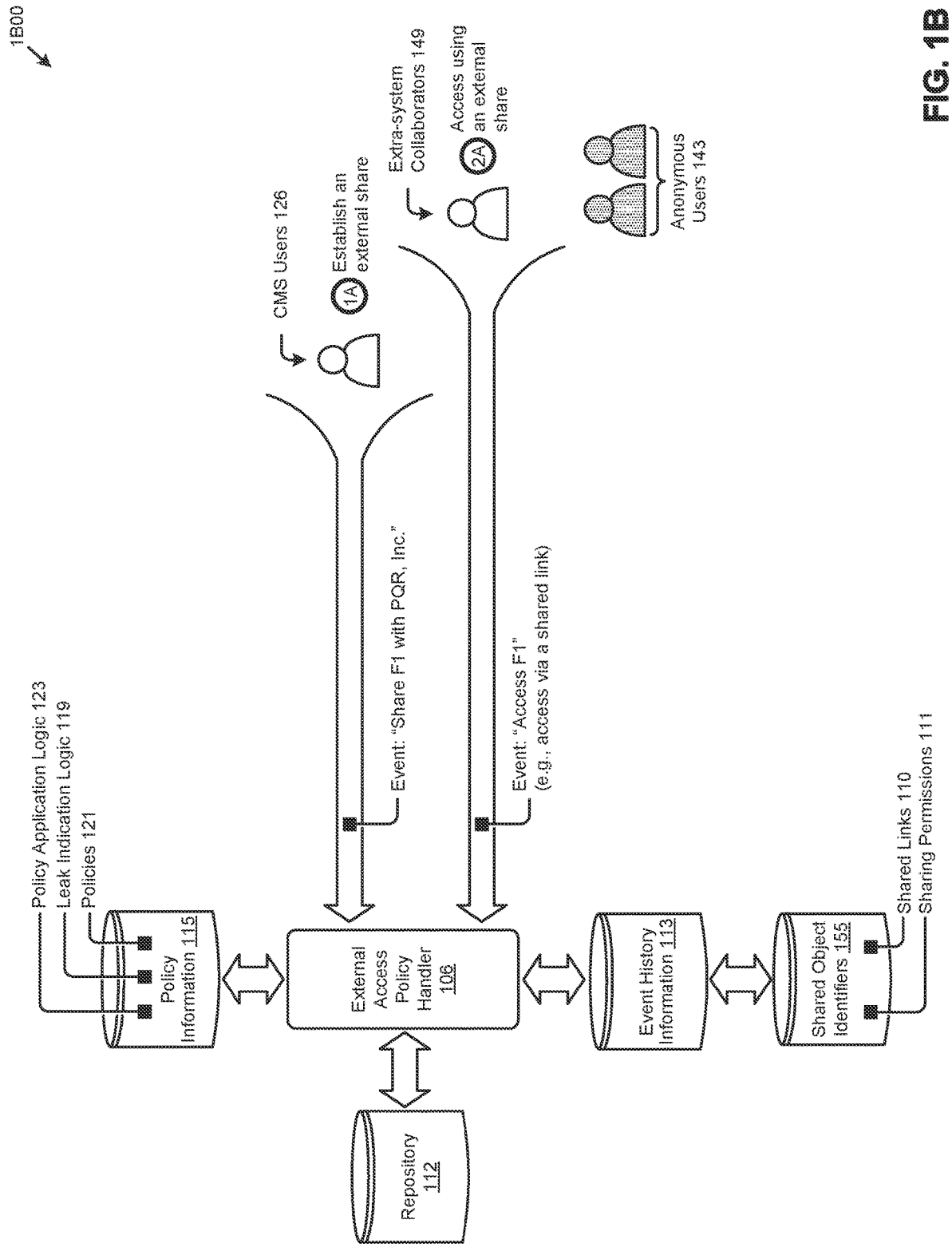
FIG. 1B is a diagram depicting an external access policy handler that distinguishes between registered content management system users, extra-system collaborators, and anonymous users, according to an embodiment.

FIG. 1B is a diagram depicting an external access policy handler that distinguishes between registered content management system users, extra-system collaborators, and anonymous users. As an option, one or more variations of diagram or any aspect thereof may be implemented in the context of the architecture and functionality of the embodiments described herein and/or in any environment.

The figure is being presented to illustrate how ongoing events (e.g., "Share F1 with PQR, Inc." and "Access F1") can be classified and captured in an event repository (e.g., event history information 113) in a manner that supports correlation of the events to policies. Strictly as an illustrative example, a data loss protection (DLP) policy can be defined to check for suspicious download events might be applied to events in the event history. As another illustrative example, a data loss protection (DLP) policy can be defined to check for sudden quanta of large amounts or large numbers of newly-generated shared links.

If some particular suspicious event or series of events is detected (e.g., by analysis of the event history), then additional information pertaining to the event or series of events can be gathered. The determination that there has been a suspicious event or a series of suspicious events can itself be codified into an entry that is stored in event history information 113. Any/all of the foregoing features can be implemented in a system such as is depicted in diagram 1B00. Moreover, many different access and policy scenarios that involve the dynamism of a content management system can be handled by the system such as is depicted in diagram 1B00. The system of diagram 1B00 is now briefly described.

As shown, an external access policy handler 106 is configured to process a wide range of dynamically-changing information. In the example shown, the policy handler is interfaced with policy information 115, object storage portions of repository 112, event history information 113, as well as a repository of shared object identifiers 155. Any given repository of shared object identifiers may include shared object identifiers that correspond to those for which a shared link 110 has been generated, and any given repository of shared object identifiers may include an indication of sharing permissions 111 that correspond to respective shared object identifiers.

Further, external access policy handler 106 is configured to receive events that arise from CMS users 126 to establish an external share (operation 1A) as well as events that arise from extra-system collaborators 149 to access data using an external share (operation 2A). In some cases, an external share is implemented as a shared link (e.g., URI or URL) that is communicated (e.g., by forwarding an email that includes the shared link) to one or more anonymous users 147. In some situations, merely possessing the URL that constitutes the link is enough for even an anonymous user to access the content object to which the shared link refers. In some embodiments such as, when an anonymous user makes an attempt to access a content object via a shared link, the content management system will create a guest account. Once the guest account has been created, the content management system keeps track of however many user devices might be used by the guest. Automatic creation of a guest account might be specifically permitted or denied or in some way limited based on one or more policies 121. More specifically, one or more policies together with other logic might be amalgamated into a repository of policy information 115. Such a repository can be accessed by external access policy handler 106. As such the external access policy handler is able to access policy application logic 123 to know when to apply a particular policy (e.g., what events might cause a policy to be applied) as well as to know what policy-oriented logic (e.g., leak indication logic 119) should be applied to a particular series of events.

As earlier indicated, merely possessing the URL that constitutes the link is enough for even an anonymous user to access the content object. This often introduces vulnerabilities that can be identified, assessed, and mitigated (e.g., by an analyst) using the aforementioned interactive user interface. However, identification of vulnerabilities and determination of characteristics of the vulnerabilities relies, at least in part, on a wide range of information collected over a potentially long period of time. Moreover, analysis of the events to determine characteristics of the vulnerabilities might need to be performed by a human analyst. Given the foregoing, some mechanism is needed to be able to process a huge number of events (e.g., hundreds of millions or more) that have occurred over a long period of time (e.g., many months). More specifically, some mechanism is needed to be able to transform the huge amount of data into a data set that supports interactive analysis via an interactive user interface. Still further, some mechanism is needed to generate an interactive user interface that supports human analysis of the transformed data. One possible system to generate such transformed data to an interactive user interface is shown and described as pertains to FIG. 1C.

Figure 1C:
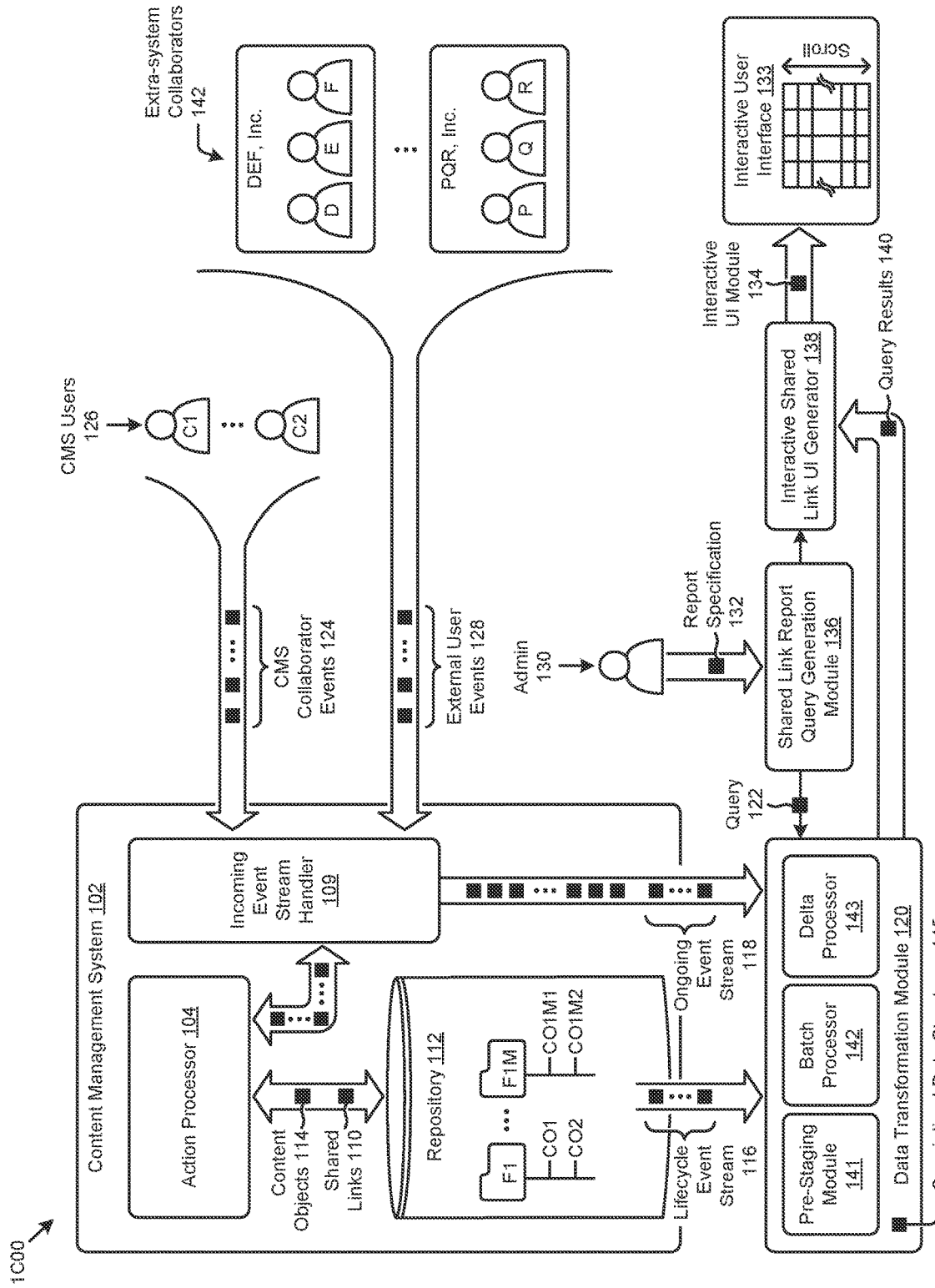
FIG. 1C depicts an interactive user interface generation system that draws from multiple event streams of a content management system, according to an embodiment.

FIG. 1C depicts an interactive user interface generation system that draws from multiple event streams of a content management system. As an option, one or more variations of interactive user interface generation system 1C00 or any aspect thereof may be implemented in the context of the architecture and functionality of the embodiments described herein and/or in any environment.

The figure is being presented to illustrate how a data transformation module 120 can be interfaced to a content management system 102 so as to be able to combine and process events from a lifecycle event stream 116 as well as from an ongoing event stream 118. The ongoing event stream might include any events that arise from registered CMS users (e.g., CMS collaborator events 124) and/or events that arise from extra-system collaborators (e.g., external user events 128). Any of the foregoing events might be received at an incoming event stream handler 109. Moreover, any of the foregoing events might be processed by the incoming event stream handler, possibly in combination with action processor 104. This architecture offers a great deal of flexibility in processing incoming events. Specifically, in addition to an initial classification of events as they occur (e.g., to classify events over shared links 110), the action processor can service requests corresponding to incoming events by accessing repository 112. As shown, repository 112 includes folders (e.g., folder F1 and folder F1M) as well as content objects (e.g., content object CO1, content object CO2, . . . , content object CO1M1, and content object CO1M2) that are accessed via such folders.

Any externally-raised events of any sort, whether arising from CMS users 126 (e.g., CMS user C1 and CMS user C2), or whether arising from extra-system collaborators 149 (e.g., external user D, external user E, external user F, external user P, external user Q, or external user R), can be processed by the incoming event stream handler 109. Moreover, incoming event stream handler can autonomously synthesize new events and enter them into the ongoing event stream. Strictly as one example of such new event synthesis, the incoming event stream handler can recognize an incoming event from an anonymous user, then automatically create a guest account, then enter the occurrence of that guest account creation as an event in the ongoing event stream and/or enter the occurrence of that guest account creation as an event in the lifecycle event stream. Any of the foregoing events, whether arising from outside of the CMS, or whether generated by the CMS itself, can be tagged in a manner that supports analysis with respect to the nature of actions corresponding to the event, the nature of actions taken over the content objects 114 (e.g., READ, WRITE, PREVIEW, RENAME, etc.), and/or the timing of events or the timing of sequences of events. Such analysis can be carried out by a data transformation module 120, which is now briefly discussed.

As shown, data transformation module 120 is configured to support pre-staging of data (e.g., via pre-staging module 141), batching (e.g., via batch processor 142), and incremental data processing (e.g., via delta processor 143).

Once the data has been transformed into one or more specialized data structures (e.g., so as to support analytical operations from within an interactive user interface 133), the specialized data structures 145 can be queried. In the embodiment shown, an admin 130 can generate a report specification 132, which is then used by a shared link report query generation module 136 to cause execution of a query 122 over the transformed data.

The aforementioned query 122 can be specific to a particular external user or to a particular external user entity. Strictly as one example, when generating a shared link report and its interactive interface for external user entity "DEF, Inc." 144, then the query 122 might select data that corresponds in some way to entity "DEF, Inc." 144 while not selecting data that corresponds in some way to entity "PQR, Inc." 146. As such many different external user entities can be concurrently support—yet without sharing information that might be proprietary to entity "DEF" with entity "PQR".

During and/or after the time when query 122 is executed over the specialized data structures 145 of the data transformation module 120, query results 140 are made available to interactive shared link UI generator 138 which in turn outputs an interactive UI module 134.

As earlier described, action processor 104 can service requests corresponding to incoming events by accessing repository 112. However, there are certain situations where, before satisfying a user's content object access request, the action processor needs to retrieve a user profile corresponding to the requesting user. In some such situations the requesting user is deemed to be an anonymous user and, as such, some means to generate at least a guest profile needs to be provided. Furthermore, since activities of an anonymous user are often suspect, and since activities of an anonymous user often present vulnerabilities to the CMS, some means to manage anonymous users needs to be provided. Moreover, since it often happens that forensic analysis is surmounted after a data loss breach, some means to gather information about an anonymous user needs to be provided. One possible implementation of a means to enrich user profiles is shown and described as pertains to the user profile processing flow of FIG. 1D.

Figure 1D:
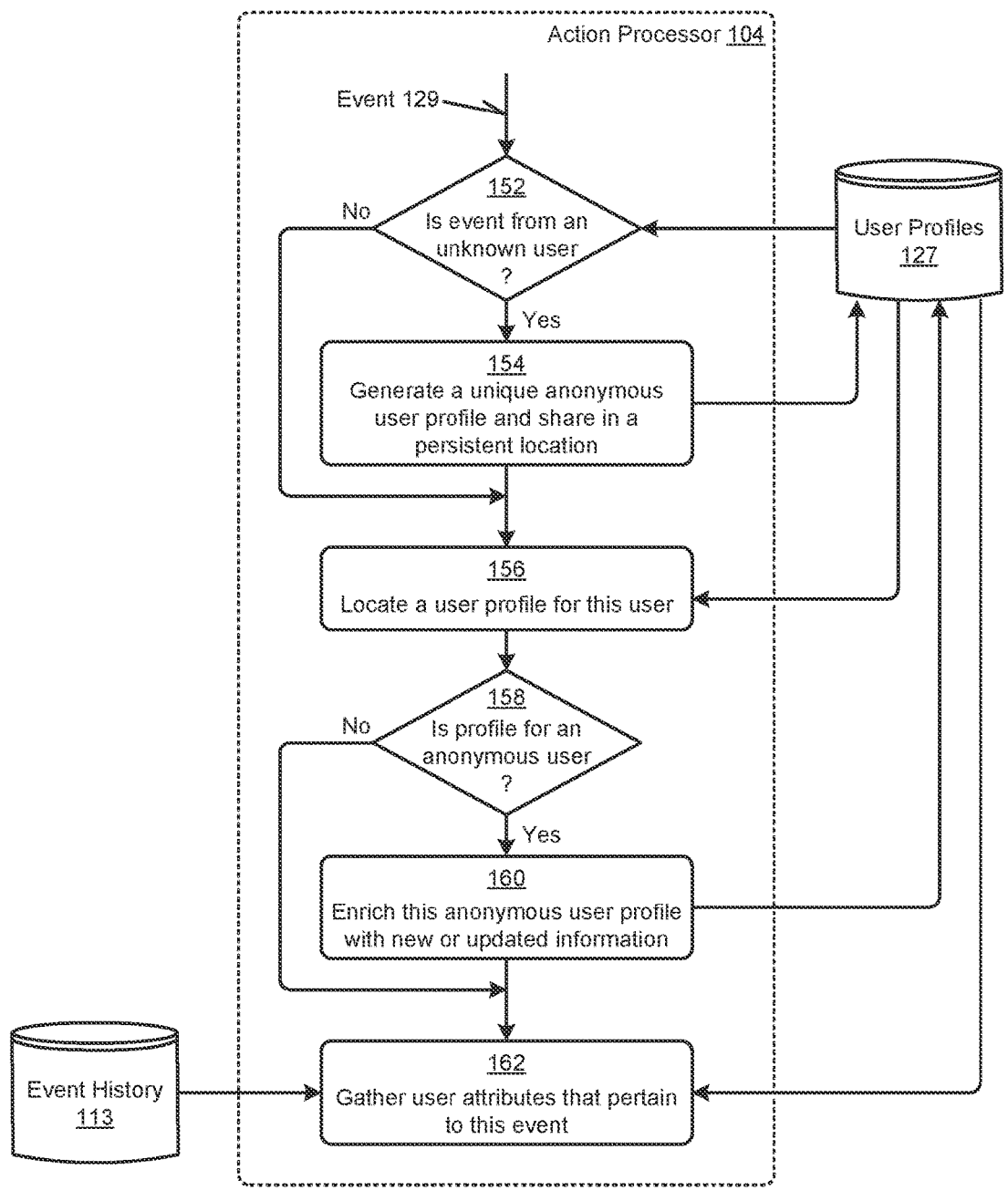
FIG. 1D depicts an example user profile processing flow that handles generation and enrichment of anonymous user profiles based on an occurrence of an incoming event, according to an embodiment.

FIG. 1D depicts an example user profile processing flow that handles generation and enrichment of anonymous user profiles based on an occurrence of an incoming event. As an option, one or more variations of user profile processing flow 1D00 or any aspect thereof may be implemented in the context of the architecture and functionality of the embodiments described herein and/or in any environment.

The figure is being presented to illustrate how an incoming event that is raised by an anonymous user can be processed so as to enrich data about the anonymous user such that the enriched data can be used when making a threat assessment. In the shown embodiment of FIG. 1D, the user profile processing flow 1D00 is implemented within action processor 104.

As shown, decision 152 serves to determine if event 129 corresponds to a known user (e.g., a user who has a CMS system user profile), or whether event 129 was raised by an unknown user. An unknown user is merely a user for whom there is no corresponding user profile. This is different from an anonymous user at least in the sense that an anonymous user might have a corresponding auto-generated anonymous user profile. If it is determined that the event is deemed to correspond to an unknown user (e.g., no profile record is found in user profiles 127), then the "Yes" branch of decision 152 is taken and a unique anonymous user profile is generated (step 154). Otherwise the "No" branch of decision 152 is taken and a user profile is located (step 156).

In this flow, by the time that decision 158 is reached, a user profile has been located, for example, because a CMS user profile was found during the processing of decision 152, or because an anonymous user profile was generated (e.g., at step 154). As such, decision 158 is sufficiently informed to be able to determine whether or not the located user profile corresponds to an anonymous user profile. If not, then the "No" branch of decision 158 is taken. If so, the "Yes" branch of decision 158 is taken and step 160 serves to enrich the anonymous profile with new or updated information. New or updated information might include the then-current network path over which communication is being carried out. Additionally or alternatively, new or updated information might include any information about the anonymous user's device. Additionally or alternatively, new or updated information might correspond to use patterns (e.g., possibly suspicious event sequences) that emerge based on the new or updated information as compared to historical event sequences. In some cases, the user's device already contains an agent. In some cases an agent can be installed on the user's device so as to facilitate retrieval of any information about the user's device and/or its user.

Recalling again that one function facilitated by the CMS and, more particularly, one function facilitated by the interactive user interface, is to aid an analyst in forensic investigation. One significant corpus of information about the user's device and/or its user derives from the user's own user profile 127. Another significant corpus of information about the user's device and/or its user derives from information in event history 113. As such, step 162 serves to gather user attributes that pertain to this event. Such user attributes might include information that is included in user profiles 127, or such user attributes might include information that is included in event history 113, or both. For example, if the user profile of the user that raised event 129 is a newly-onboarded user, and if recent events drawn from the event history as pertains to this newly onboarded user comports with an event signature (e.g., an event cluster) that is typical of a newly-onboarded user, then that fact alone at least suggests normal behavior of this user. On the other hand, if the set of recent events drawn from the event history as pertains to this newly onboarded user is anomalous with respect to event signatures of newly-onboarded users, then that fact suggests that event 129 should be considered in reaching a threat assessment.

Further details regarding general approaches for determining if a series of events are deemed to be anomalous are described in U.S. application Ser. No. 16/948,779 titled "DETECTING ANOMALOUS DOWNLOADS" filed on Sep. 30, 2020, which is hereby incorporated by reference in its entirety.

As is understood by those of skill in the art, detecting sequences of events so as to identify anomalous behavior may be felicitously enabled by organizing incoming events into a particularly configured graph-oriented data structure such that a resulting graph-oriented data structure can be queried for specific sequences (e.g., involving specific users and/or specific content objects, etc.). As such, some implementations include a graph processor, which graph processor handles graph-oriented storage of incoming events. One possible implementation of such a graph processor is shown and described as pertains to FIG. 1E.

Figure 1E:
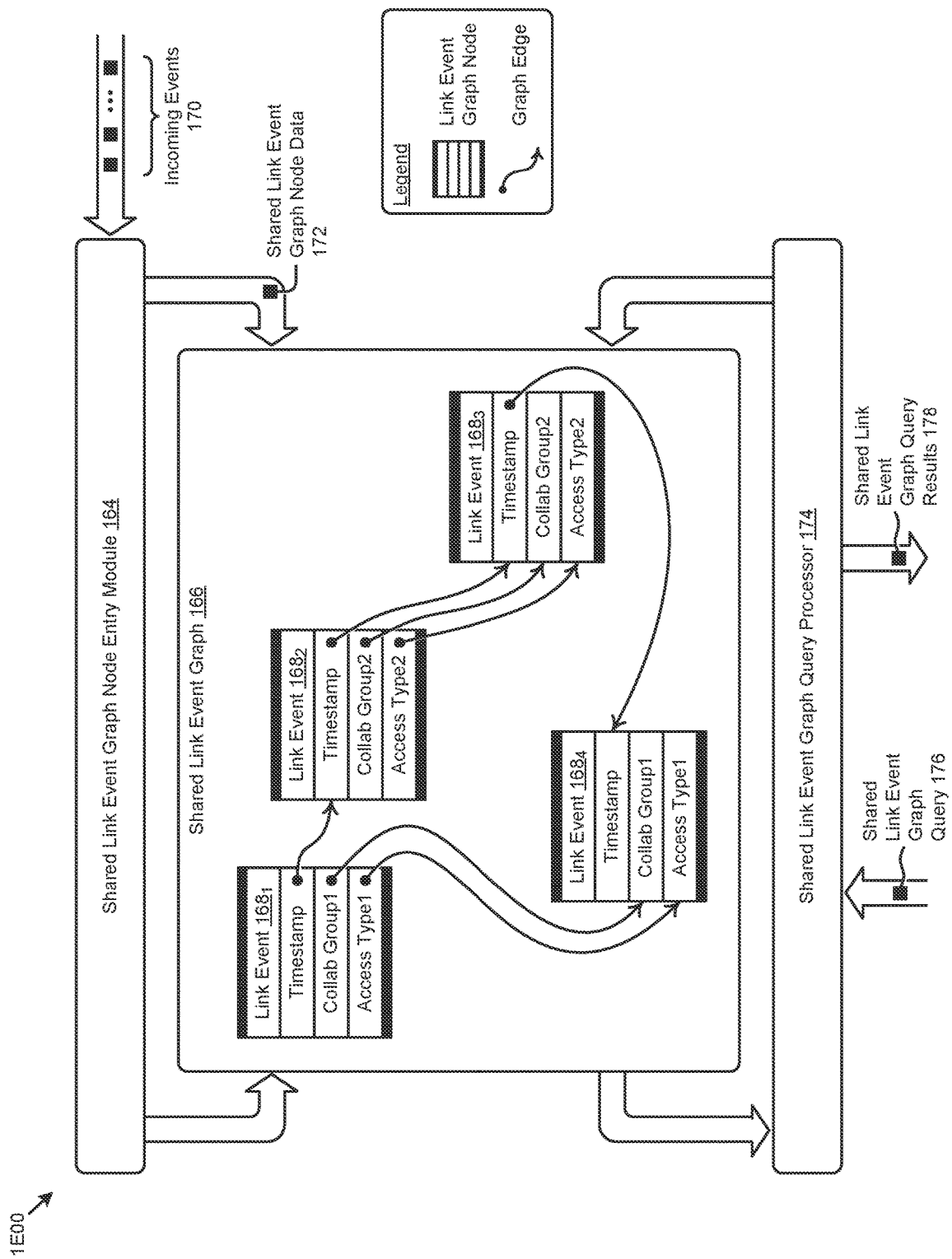
FIG. 1E depicts an example graph processor, according to an embodiment.

FIG. 1E depicts an example graph processor. As an option, one or more variations of graph processor 1E00 or any aspect thereof may be implemented in the context of the architecture and functionality of the embodiments described herein and/or in any environment.

The figure is being presented to illustrate one possible implementation of a graph processor and its use in the context of a collaboration system. More specifically, figure is being presented to illustrate how a shared link event graph data structure can be generated from incoming events 170. Still more specifically, the figure is being presented to illustrate how nodes of shared link event graph 166 can be connected via edges that facilitate generation of query results that pertain to shared links.

Referring again to data transformation module 120 (e.g., as depicted in FIG. 1C), the data transformation module 120 is configured to support operations involving pre-staging of data, batching of data, and incremental data processing, the performance of which operations can be facilitated by one or more specialized data structures. One possibility for specialized data structures involves a graph-oriented organization of data such that retrieval of specific types of information can be performed using far fewer computer processing resources than would be otherwise demanded in absence of such a graph-oriented organization of data.

The graph processor 1E00 is depicted as having a shared link event graph node entry module 164 and a shared link event graph query processor 174. The shared link event graph node entry module generates a shared link event graph 166 and the shared link event graph query processor accesses the shared link event graph so as to produce shared link event graph query results 178 in response to receipt of a shared link event graph query 176. The shared link event query results 178 can be delivered to any actor within the data transformation module 120. Moreover, the shared link event graph query results 178 can be delivered to any actor within the data transformation module 120 irrespective of the origin of shared link event graph query 176.

As used herein, a shared link event graph query refers to a specification of any number of characteristics or aspects of nodes or edges of a data structure that contains or refers to accesses made to content objects by any one or more collaborators. In some cases, a shared link event graph query refers to a specification of a particular set of characteristics of nodes or edges of a data structure that codifies actions taken over content objects that are accessible by extra-system collaborators.

As shown, the data items of the nodes of shared link event graph 166 are specifically selected to include those data items that are useful in identification of vulnerabilities (e.g., anomalous patterns of accesses over the shared links). In this particular example, and as shown, each node corresponds to an event over an extra-enterprise shared link URL (e.g., link event $168_1$, link event $168_2$, link event $168_3$, link event $168_4$). Additionally, and as shown, each node includes a timestamp, an indication of a collaboration group (e.g., collab group1, collab group2) and an access type (e.g., access type1, access type2). These nodes, and corresponding node data can be selected (e.g., selected from the stream of incoming events) based on receipt of incoming shared link event graph node data 172. The nodes can then be connected via edges that facilitate generation of query results that pertain to shared links. As an example, shared link event graph query 176 might comprehend the semantics of "Show me all link events at or after time='Tx' where the link events correspond to accesses of 'Type2'". The shared link event graph query results for this example query, using the specific example of shared link event graph 166, would return link event $168_2$ and link event $168_3$. It should be noted that, over time, there might have been many hundreds of thousands or even many millions of incoming events 170 that were processed by even graph node entry module 164. In spite of this large volume of events, since the shared link event graph comprises nodes and edges that pertain to queries over shared links, then generating shared link event graph query results 178 can be done without having to re-process incoming events 170.

Further details regarding general approaches for forming and querying an event graph are described in U.S. Pat. No. 10,922,282 titled "ON-DEMAND COLLABORATION USER INTERFACES" granted on Feb. 16, 2021, which is hereby incorporated by reference in its entirety.

Any of the systems and techniques as shown and described as pertains to the foregoing FIG. 1A, FIG. 1B, FIG. 1C, FIG. 1D, and FIG. 1E can be employed, singly or in combination, to generate a shared link report and/or to form a threat assessment therefrom. One such combination is shown and described as pertains to FIG. 2.

Figure 2:
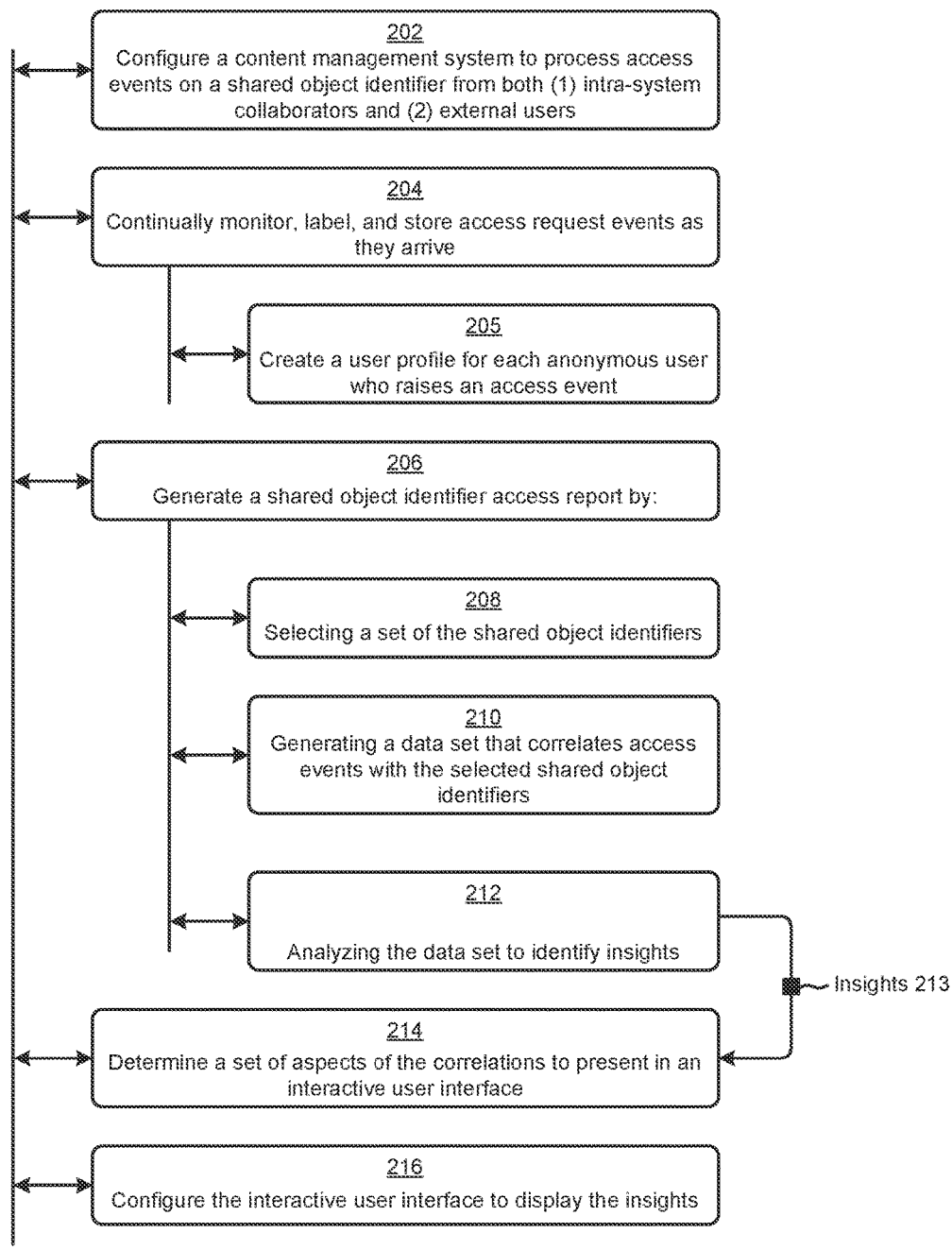
FIG. 2 is a flowchart depicting operations of a threat analysis tool generation system, according to an embodiment.

FIG. 2 is a flowchart depicting operations of a threat analysis tool generation system. As an option, one or more variations of threat analysis tool generation system 200 or any aspect thereof may be implemented in the context of the architecture and functionality of the embodiments described herein and/or in any environment.

The figure is being presented to illustrate one example of how a series of operations can be configured to generate a scalable interactive user interface based on capture and analysis of events on shared objects. More particularly, the figure is being presented to illustrate how selected access events of a content management system can be analyzed to produce insights 213 which are subsequently made available in an interactive user interface.

In this embodiment, the content management system is configured to store content objects for access by (1) intra-system collaborators of the content management system (e.g., users corresponding to a first enterprise) and (2) extra-system collaborators (e.g., users corresponding to a second, different enterprise), which extra-system collaborators are associated an email alias or other unique identifier or designation. To facilitate sharing certain ones of the content objects, one or more extra-enterprise shared link URLs are configured (a) to refer directly or indirectly to corresponding content objects and (b) to permit the extra-system collaborators to access at least some of the content objects over an Internet connection (step 202).

On an ongoing basis, the content management system monitors and stores access requests that occur over at least some of the content objects. In some cases, at least some of the access requests are labeled to indicate a type of access requested and to indicate the identity of the users (e.g., intra-system collaborators and/or extra-system collaborators) who raised the access requests (step 204). In some situations a profile is generated for an anonymous user (step 205).

As indicated above, one desired output of threat analysis tool generation system 200 is to produce insights 213 which are processed to be made available in an interactive user interface. To accomplish this, the system generates the aforementioned interactive user interface module (step 206) by: processing a shared link report query to select a set of the extra-enterprise shared link URLs (step 208), generating a data set for the interactive user interface module, which data set correlates a series of access requests (step 210), and analyzing the data set to correlate individual ones of the selected extra-enterprise shared link URLs with specific ones of the series of access requests (step 212). In doing so, insights 213 are generated, which insights are included in, or made available to the interactive user interface.

The interactive user interface operates by capturing user inputs via user interaction with various instances of user interface screen devices that are presented to a user (e.g., on a display screen of a computer). In response to user inputs, the user interface module determines a corresponding subset of subject extra-enterprise shared link URLs (step 214). Further, in response to further user inputs, the interactive user interface module provides (1) a view of specific ones of the series of access requests and/or (2) a view of specific ones of the insights. As such, a user can conveniently assess security risks that pertain to specific ones of (or groups of) the selected extra-enterprise shared link URLs (step 216).

This particular embodiment operates within or alongside of a content management system that is configured to generate an interactive user interface module. One possible technique for generating an interactive user interface module is shown and described as pertains to FIG. 3A.

Figure 3A:
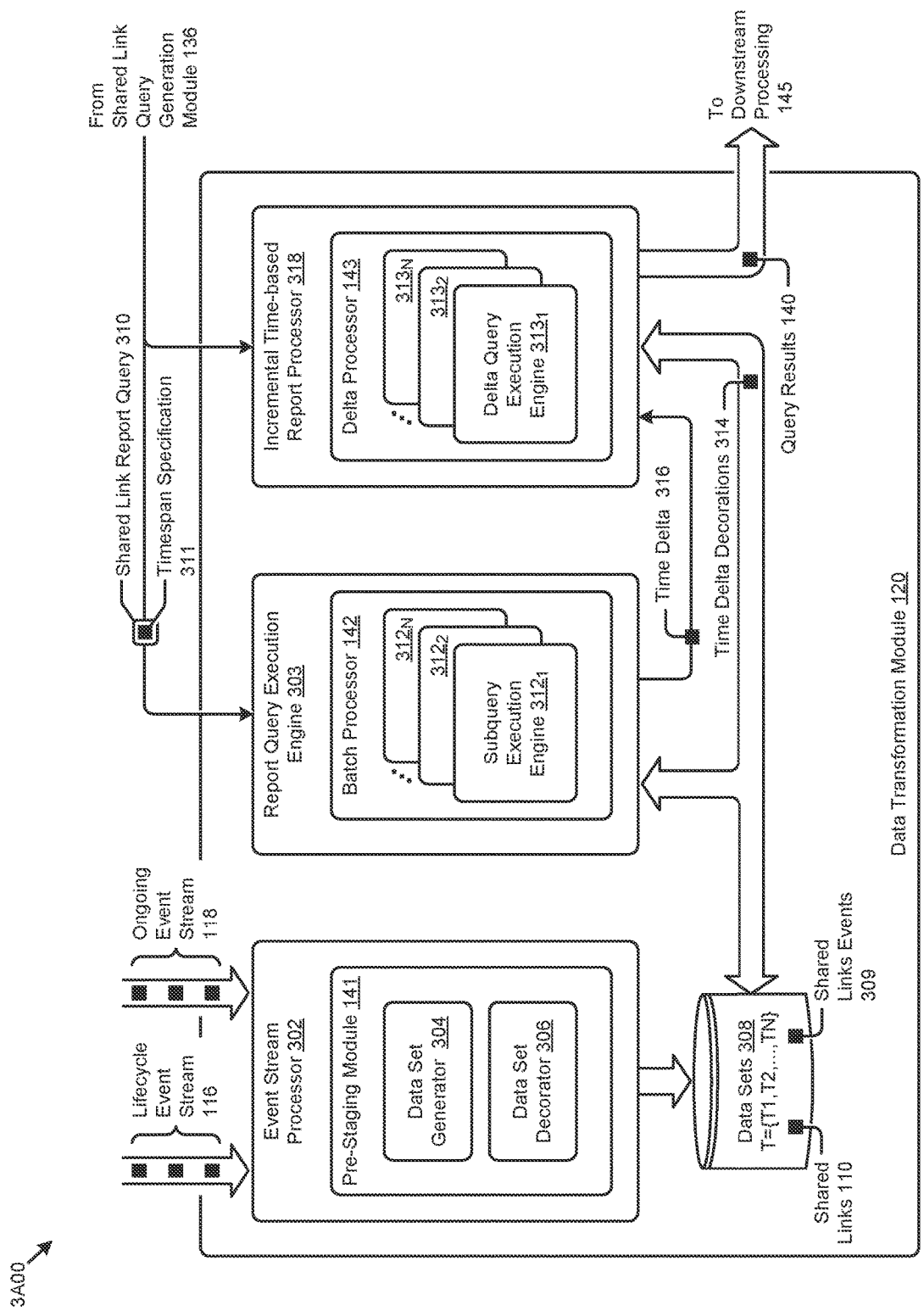
FIG. 3A depicts a scalable interactive user interface generation system that reports collaboration system risks based on capture and analysis of events on shared objects, according to an embodiment.

FIG. 3A depicts a scalable interactive user interface generation system that reports collaboration system risks based on capture and analysis of events on shared objects. As an option, one or more variations of scalable interactive user interface generation system 3A00 or any aspect thereof may be implemented in the context of the architecture and functionality of the embodiments described herein and/or in any environment.

The figure is being presented to illustrate one possible embodiment of data transformation module 120. More specifically, the figure is being presented to illustrate how a corpus of many millions of events (or more) can be processed incrementally in batches.

As shown, an event stream processor 302 receives events of the CMS system. The event stream processor in turn implements a pre-staging module 141 that generates (e.g., via data set generator 304) or adds informational decorations (e.g., via data set decorator 306) to one or more data sets (e.g., data sets 308).

Further, the figure illustrates how batches can correspond to time periods, which time periods can be made as granular as needed. Specifically, a first data set of the data sets might correspond to time T=T1, a second data set of the data sets might correspond to time T=T2, a third data set of the data sets might correspond to time T=T3, etc.). Any portion of any of the data sets can be accessed (e.g., queried over) to retrieve any portion or sub-portion of the data. Strictly as an example, individual portions of data sets 308 (e.g., individual rows, individual entries, individual relations) can be retrieved by any downstream module.

In the specific example of FIG. 3A, such downstream modules are shown as retrieving shared links 110 as well as shared link events 309. The foregoing downstream modules cooperate so as to provide query results 140 in response to receipt of a shared link report query 310 that includes a timespan specification 311. The query results are in turn are used by interactive shared link UI generator 138 to present findings in a manner that aids human cognition.

Strictly as an example, a shared link report query might carry the semantics of, "Generate a report that includes a threat classification of the shared links that were accessed within the last 30 days." Rather than attempt to gather all of the events on the subject shared links—which could comprise millions of events—the shared link report query execution engine 303 might invoke a batch processor 142 which in turn might break down the timeframe of the timespan specification into more granular time periods (e.g., the coarse period of 30 days might be broken down into 30 one-day time periods). The batch processor can use the more granular time periods for invoking any number of subquery execution engines (e.g., subquery execution engine $312_1$, subquery execution engine $312_2$, subquery execution engine $312_N$, etc.). The subquery execution engines can run in parallel or in series. In some cases, the granular time period or time periods as determined by the batch processor are provided to a report processor (e.g., incremental time-based report processor 318). Additionally, the batch processor 142 may provide time delta decorations 314.

To illustrate the efficacy of this architecture, consider the scenario where there are (for example) 10 million events on the documents corresponding to the subject shared links. Further consider that there may be only a small subset of event types of the 10 million events that are relevant to forming the requested threat classification. In such as case, a subquery execution engine of the batch processor can emit a query that requests only those events of the event types that are relevant to forming the requested threat classification or ranking. Event types can include, but are not limited to event types that correspond to designating a content object as "Public" or, event types that correspond to designating a content object as "Restricted", or event types that correspond to designating a content object as "Collaborative". Any of such designations can be made autonomously by the CMS, or, any of such designations can be made in response to a user or administrator action.

The combination of the granular time period (e.g., time delta 316) as determined by the batch processor together with data (e.g., time delta decorations 314) corresponding to events that had occurred in the time period are made available to the incremental time-based report processor 318. That data can then be processed (e.g., in batches) into results that correspond to the shared link report query, which in this example was, "Generate a report that includes a threat classification or ranking of the shared links that were accessed within the last 30 days."

The incremental time-based report processor 318 is able to process a shared link report query 310 based on the shared link report query itself in combination with the data received from the shared link report query execution engine 303. More particularly, the incremental time-based report processor is able to decompose (via delta processor 143) a particular shared link report query 310 into multiple delta times, which together cover at least the time range of timespan specification 311. Any/all of the multiple delta times can form the basis for multiple time period-based queries, which queries can in turn be executed by any one or more delta query execution engines (delta query execution engine $313_1$, delta query execution engine $313_2$, . . . , delta query execution engine $313_N$). The results of queries as performed by the one or more delta query execution engines can be sent to downstream processing 145

Continuing the foregoing example, this might mean that incremental time-based report processor scans result from the multiple granular time delta data to extract only the data that corresponds to events that inform a threat classification or ranking. As such, the data transformation module 120 is able to provide only the limited set of information that would need to be presented in a user interface.

Now, returning to event stream processor 302, it can now be understood that downstream processing might need to execute certain types of queries. To aid in handling huge amounts of data corresponding to tens or millions of events, the pre-staging module 141 might process the incoming events in view of expected queries. In some systems, final reports can be generated based on predetermined combinations of only a finite set of queries. In some such systems, it can be known a priori what queries or subqueries the downstream modules will/can execute over data sets 308, and as such, certain of the data comprising the data sets can be pre-staged. Strictly as an example, if it can be known that only events of type="X" or of type="Y" are used in any of the a priori known queries or subqueries, then the data structures or tables or relations corresponding to data sets 308 can be populated with only events of type="X" or of type="Y".

In some embodiments, generation of a final report and/or generation of an interactive user interface can take place by processing a series of steps that interrelate results of a shared link report query with results of a shared link event graph query. Specifically, strictly as an example, the focus and/or size of a report and/or corresponding outputs and/or data structures (e.g., data structures of a corresponding interactive user interface) can be established by processing a shared link report query over the shared link event graph data structure to select only a certain set of extra-enterprise shared link URLs (e.g., extra-enterprise shared link URLs that pertain to, or belong to, a particular enterprise). Next, based at least in part on the particular selected set of the extra-enterprise shared link URLs, processing a shared link event graph query over the shared link event graph data structure. This technique can be used to further sharpen the focus and/or reduce the size of a report and/or a corresponding interactive user interface. Strictly as one example, processing a shared link event graph query over the shared link event graph data structure might result in gathering only event data corresponding to certain types of events.

The results of processing the foregoing shared link event graph query over the shared link event graph data structure can be reformatted for use in a human-readable report. Additionally or alternatively, the results of processing the foregoing shared link event graph query over the shared link event graph data structure can be reformatted so as to generate a data set that underlies an interactive user interface module.

In this latter case, the interactive user interface module might include screen devices (e.g., GUI widgets) that serve to capture user inputs which are in turn used by the interactive user interface module to refine how the interactive user interface module accesses and processes the underlying data. For example, an interactive user interface module might include screen devices that serve to specify whatever the user deems are relevant timeframes. As another example, an interactive user interface module might include screen devices that serve to specify whatever the user deems to be relevant event types, and/or collab groups, and/or access types, etc.

Privacy Policies

In some cases, there may be a policy or other requirement to observe privacy. Such a policy or other requirement might govern handling of at least some information that is at least potentially present in the data of the data sets that underly a given interactive user interface module. In applicable cases, privacy requirements might be applied to the data prior to population of the data into the data sets. In some cases, redactions to remove or obfuscate one or more items of personally identifiable information are applied to the data prior to population of the data into the data sets.

Figure 3B:
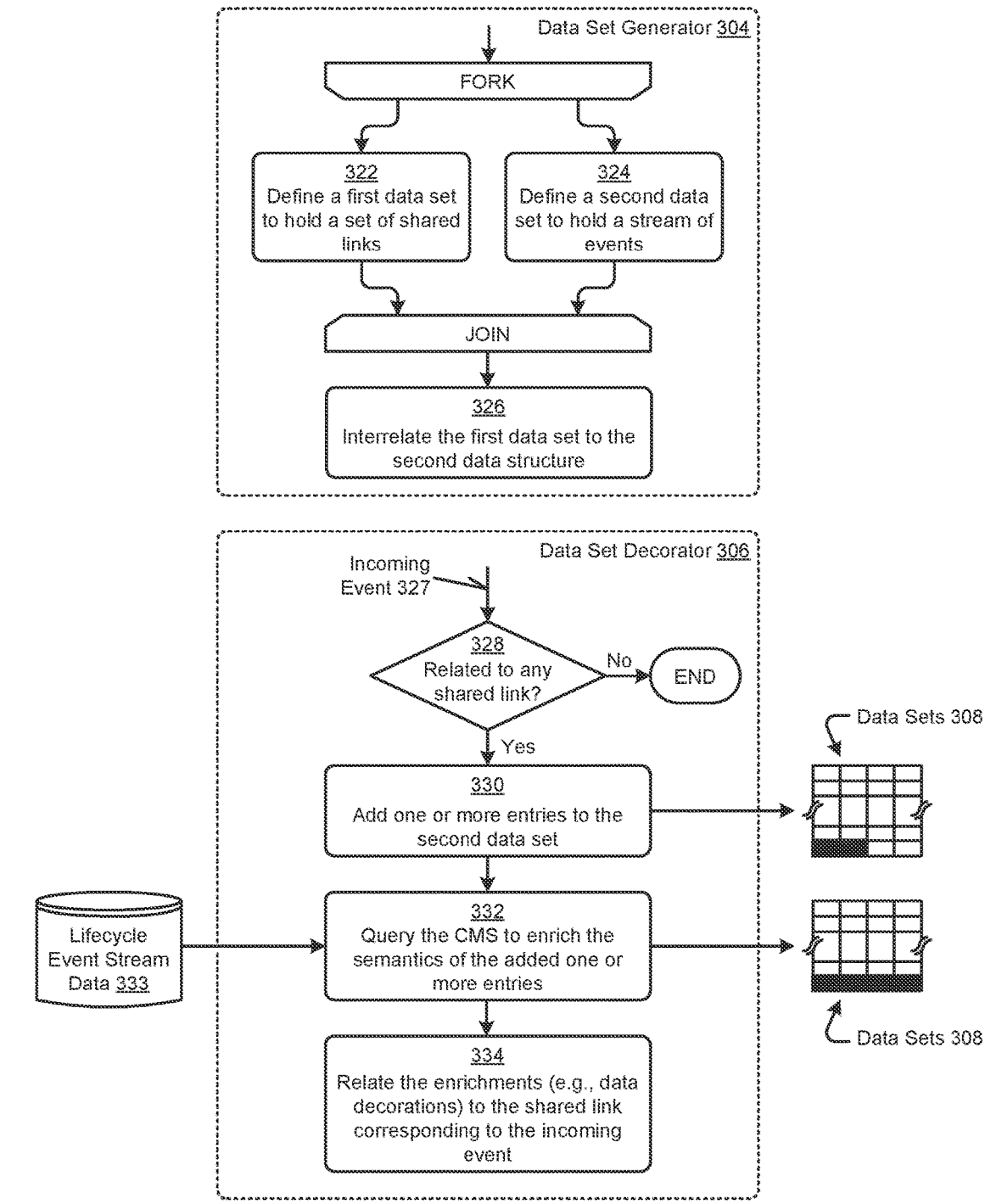
FIG. 3B depicts a scalable data collection system that is used in systems that calculate and report collaboration system risks based on capture and analysis of events on shared objects, according to an embodiment.

FIG. 3B depicts a scalable data collection system that is used in systems that calculate and report collaboration system risks based on capture and analysis of events on shared objects. As an option, one or more variations of scalable data collection system 3B00 or any aspect thereof may be implemented in the context of the architecture and functionality of the embodiments described herein and/or in any environment.

As heretofore mentioned, it can be felicitous to pre-stage data. In some cases, a specific representation of the data is determined even before data structures or tables are populated. In fact, it can happen that certain subqueries are very frequent, whereas other subqueries are less frequent. Accordingly the data set representation may be informed by such a distribution such that the data representation is optimized for repeated, high-frequency retrieval. An appropriate data representation (e.g., a list, a sorted table, a linked list, a Java hashset, etc.) can be chosen based upon the nature and frequency of expected subqueries.

In the specific example of FIG. 3B, step 322 of data set generator 304 defines a first data set to hold a set of shared links, whereas step 324 defines a second data set to hold all or portions of a stream of events that correspond to the shared links of the first data set. Step 326 serves to interrelate the first data set with the second data set. In some embodiments, the interrelationship is defined by indexes or pointers. In other embodiments, the interrelationship is defined by a database relation. In some cases, the second data set includes placeholder space and/or organization for data values that are expected to be determined later (e.g., during operation of the interactive user interface, or during ongoing operation of the CMS). For example, a data placeholder (e.g., with null data or blank data) for a possible lifecycle event (e.g., moving a data object that corresponds to a shared link, or deleting and/or invalidating a shared link based on deletion of the content object over which the shared link was generated) might be included in the second data set. That placeholder can be populated based on analysis of an incoming event into the CMS.

In the specific example of FIG. 3B, decision 328 of the shown data set decorator 306 serves to determine if an incoming event (e.g., the shown incoming event 327) is related to any shared link. If not, the "No" branch of decision 328 is taken and the data set decorator does not perform further processing. Otherwise, the "Yes" branch of decision 328 is taken and the incoming event is subjected to additional processing. In this example, the additional processing comprises step 330 to add an event occurrence entry into data sets 308 (e.g., into the second data set), step 332 to enrich the data sets, and step 334 to relate the event occurrence and enriched data (if any) to the shared link that corresponds to the incoming event.

In some embodiments, step 332 to enrich the data sets includes querying a repository of lifecycle event stream data 333. In some cases, lifecycle events that have occurred over a shared content object inform algorithms that in turn render a threat assessment. For example, if a shared link has been the subject of a large number of accesses from a large number of different anonymous users, that quantitative fact might intrinsically increase the risk that the information with the content object corresponding to the shared link could be compromised. Continuing this example, if it is indeed determined that the shared link had been the subject of a large number of accesses from a large number of different anonymous users, then this fact, in combination with a concomitant security level tagging event, might be dispositive that this shared link is highly vulnerable to a data leak threat.

Figure 3C:
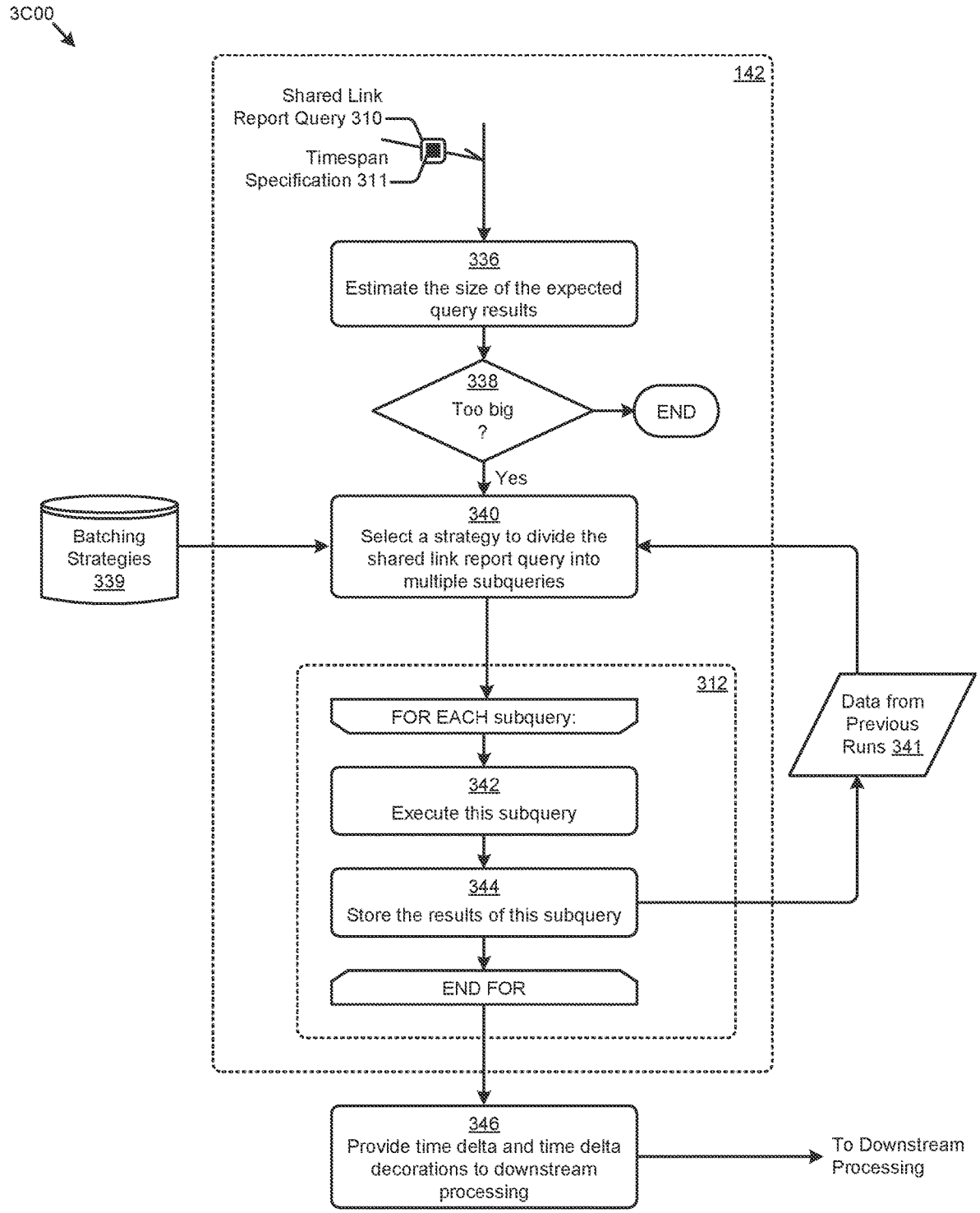
FIG. 3C depicts a scalable shared link report query execution engine that is used in systems that calculate and report collaboration system risks based on capture and analysis of events on shared objects, according to an embodiment.

FIG. 3C depicts a scalable shared link report query execution engine that is used in systems that calculate and report collaboration system risks based on capture and analysis of events on shared objects. As an option, one or more variations of scalable shared link report query execution engine 3C00 or any aspect thereof may be implemented in the context of the architecture and functionality of the embodiments described herein and/or in any environment.

The figure is being presented to illustrate how a shared link report query that (potentially) returns a huge amount of data can be batched or otherwise subdivided into multiple, smaller subqueries. In particular, the figure shows a possible implementation of batch processor 142.

As an initial operation, the size of the expected query results is estimated (step 336). In some cases, the size of the expected results might be deemed to be "Too big" (decision 338) and, if so, the "Yes" branch of decision 338 is taken. Step 340 then serves to select a batching strategy that would efficaciously divide the shared link report query into multiple subqueries.

As used herein, a shared link report query refers to a specification of any number of characteristics or aspects pertaining to content objects that are referred to and/or accessible via URLs that are published to, and/or held by extra-system collaborators. In some cases, a shared link report query refers to a specification of a particular set of characteristics of data items that in turn pertain to content objects that are accessible by extra-system collaborators. For example, a shared link report query might refer to a specification of any one or more of, a characteristic of an enterprise, a characteristic of a lifecycle event, a characteristic of an ongoing event, a date or date range, etc., any or all of which pertain to content objects that are at least potentially accessible to or by extra-system collaborators.

Batching Approaches

There are many approaches that might be effective in batching or otherwise subdividing a large query. Some such approaches include batching based on specific sets of users, whereas other batching strategies are based on time periods, and/or rules and/or heuristics that are codified into computer readable representations, which are in turn stored in batching strategies 339. A plurality of such batching strategies can be considered individually or in combination with respect to any particular incoming instance of the shared link report query. Strictly as one example batching strategy, if, given a timespan specification 311 of (for example) 30 days, then one possible batching strategy is to form 30 individual subqueries corresponding to a particular day within the 30-day range, and execute these individual subqueries in an iteration loop. This is shown by steps (e.g., step 342 and step 344) of subquery execution 312, which steps are performed within a FOR EACH loop. Incremental results from execution of subqueries can be stored into a data store corresponding to previous runs 341. The data of such previous runs can be accessed in downstream processing. Additionally or alternatively, step 346 can be configured to provide information such as time deltas and corresponding time delta decorations to downstream processing.

Figure 3D:
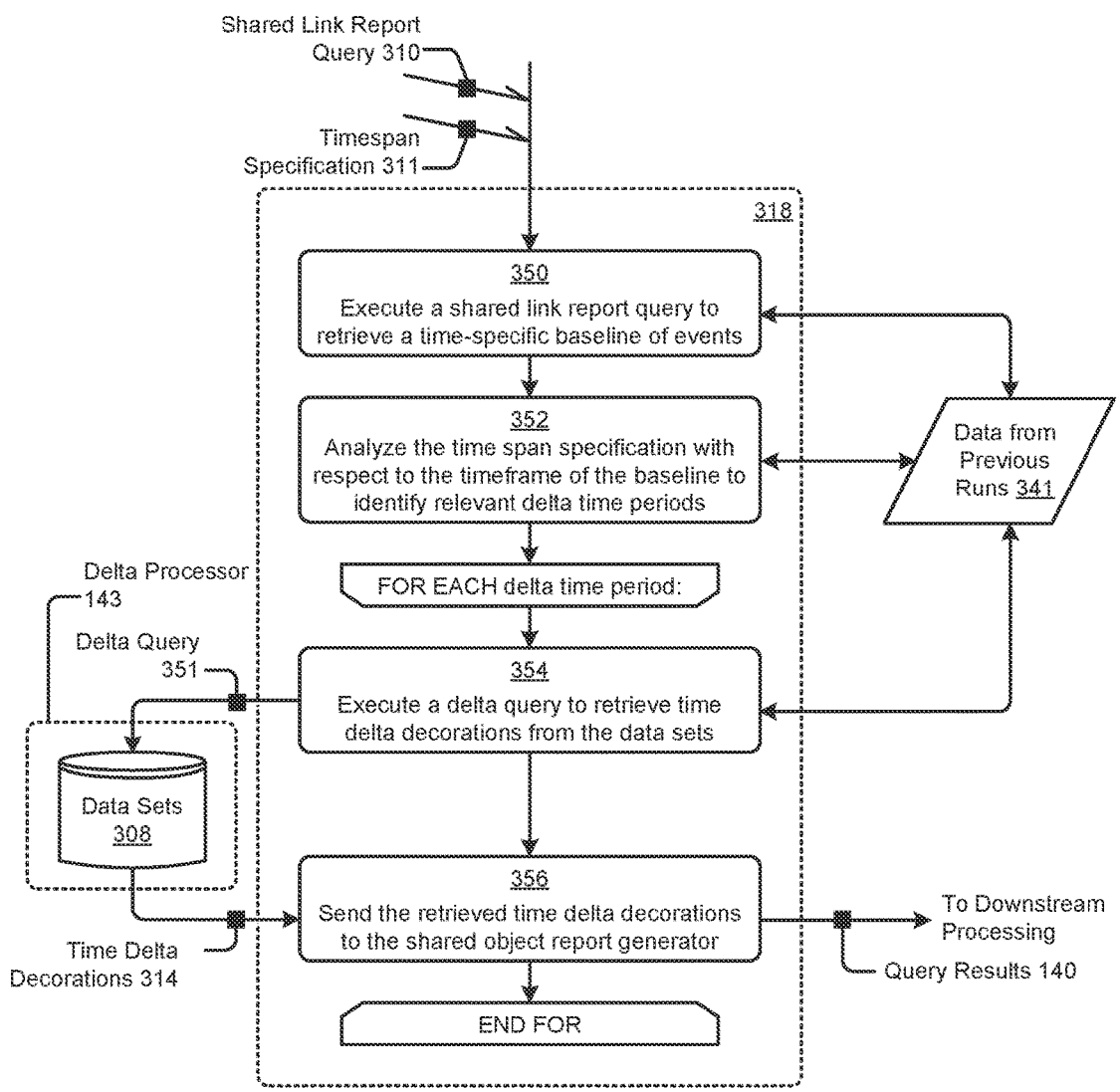
FIG. 3D depicts a scalable incremental data report processor as used in systems that calculate and report collaboration system risks based on capture and analysis of events on shared objects, according to an embodiment.

FIG. 3D depicts a scalable incremental data report processor as used in systems that calculate and report collaboration system risks based on capture and analysis of events on shared objects. As an option, one or more variations of scalable incremental data report processor 3D00 or any aspect thereof may be implemented in the context of the architecture and functionality of the embodiments described herein and/or in any environment.

The figure is being presented to illustrate one technique for how a shared link report query covering a long timeframe can be decomposed into multiple sub-queries covering shorter time periods. The motivation for executing multiple sub-queries covering shorter time periods derives from the sheer volume of query results. That is, as previously indicated, since there can be hundreds of millions or even billions of potentially threatening events in a given time period, breaking up a relatively large query (e.g., one that at least potentially returns a relatively large number of events corresponding to a relatively long time period) into relatively small queries (e.g., ones that at least potentially return a relatively small number of events corresponding to a relatively short time period) facilitates exploitation of parallelism by spawning different sub-queries onto different hardware.

To illustrate, if a given occurrence of the shared link report query 310 refers to a timespan specification 311 from (for example) "Jan. 1, 2020 through Dec. 31, 2020", that particular timespan could be decomposed into 12 time periods corresponding to the month of January 2020, the month of February 2020, and so on. In the shown embodiment, step 350 is configured to form a query to retrieve a time-specific baseline of events. In this example, the events that were deemed pending as of Jan. 1, 2020 are deemed to be the baseline timeframe. Step 352 is configured to analyze the timespan specification with respect to a determined baseline timeframe. In some cases, the data corresponding to a delta time period might have been previously processed and stored (e.g., in data from previous runs 341), and that previously processed and stored data might be accessed rather than running a sub-query again.

Strictly as one example, it might be that the data from previous runs includes data from time periods at month-by-month granularity. As another example, it might be that the data from previous runs includes data from time periods at day-by-day granularity. In any of such cases, step 352 resolves to one or more time periods over which to execute individual delta queries. The FOR EACH loop then serves, for each time period, to execute a delta query 351 to retrieve time delta decorations (step 354) and to send the retrieved time delta decorations to the shared object report generator (step 356). In certain situations, a delta query 351 might retrieve time delta decorations from data sets 308, possibly using the facilities of delta processor 143. In other situations, a delta query might access data from previous runs 341.

As shown, query results 140 are provided to downstream processing. In some cases, query results 140 are the result of applying multiple incremental delta query results to a baseline of query results.

In any of the foregoing situations, downstream processing might include using the generated query results 140 as an input to an interactive shared link UI generator 138 (e.g., such as depicted in FIG. 1C). The interactive shared link UI generator in turn generates an interactive UI module, which, when executed on a computer, displays an interactive user interface on a computer screen. The interactive user interface provides user controls so as to manipulate the data that underlies the UI such that vulnerability analysis can be performed by an analyst. The look-and-feel of such an interactive user interface may vary from implementation to implementation. Example variations showing example sets of features are shown and described as pertains to FIG. 4A and FIG. 4B.

Figure 4A:
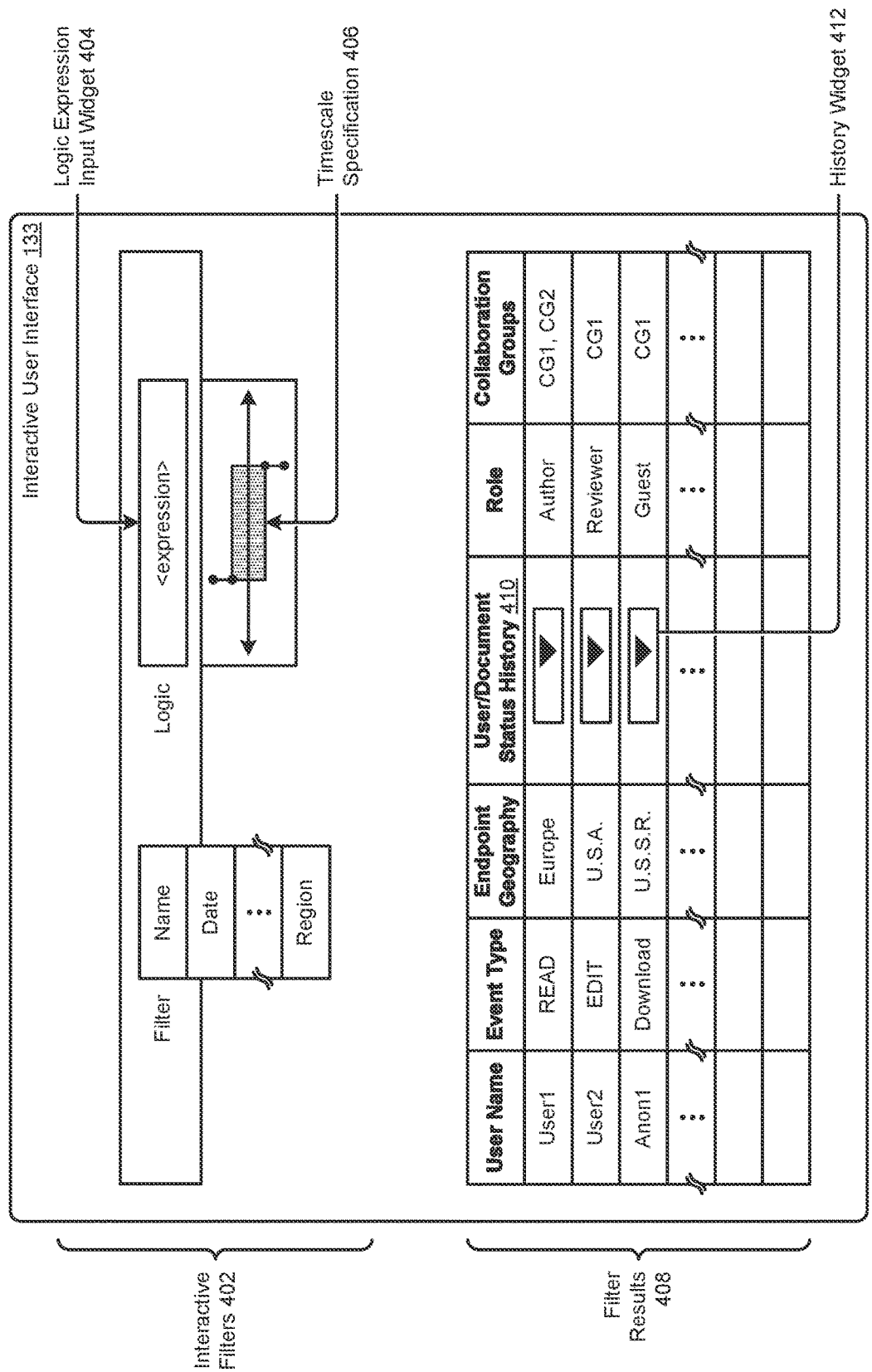
FIG. 4A and FIG. 4B depict example features of an interactive user interface as produced by systems that calculate and report collaboration system risks based on capture and analysis of events on shared objects, according to an embodiment.

FIG. 4A depicts a first set of example features of an interactive user interface as produced by systems that calculate and report collaboration system risks based on capture and analysis of events on shared objects. As an option, one or more variations of the shown interactive user interface or any aspect thereof may be implemented in the context of the architecture and functionality of the embodiments described herein and/or in any environment.

As shown, the interactive user interface 133 is composed of a display area that presents interactive widgets to implement analyst-specified interactive filters 402. Such filters can refer to a name or names (e.g., a name of a particular external entity, and/or a name of a particular user, and/or an identifier of a particular anonymous user, etc.) and/or dates or date ranges, and/or geographic regions, etc. Further, the interactive filters 402 may include a logic expression input widget 404 that is configured for an analyst to enter one or more logical expressions. Such one or more logical expressions, together with any name or date or region filters, and together with any timescale specification 406 can be used to retrieve and display filter results 408. The filter results can then be analyzed by an analyst to assess vulnerabilities. Strictly as one example, suppose the logic expression included the semantics of "Filter out all users except those who have >10 downloads within the past 1 day". In that case, the filter results might look similar to the depiction of FIG. 4A, and the analyst might delve deeper into the specific user/document status history 410 by manipulating the corresponding history widget 412 to show further details. One possible example of such further details is shown and described as pertains to FIG. 4B.

Figure 4B:
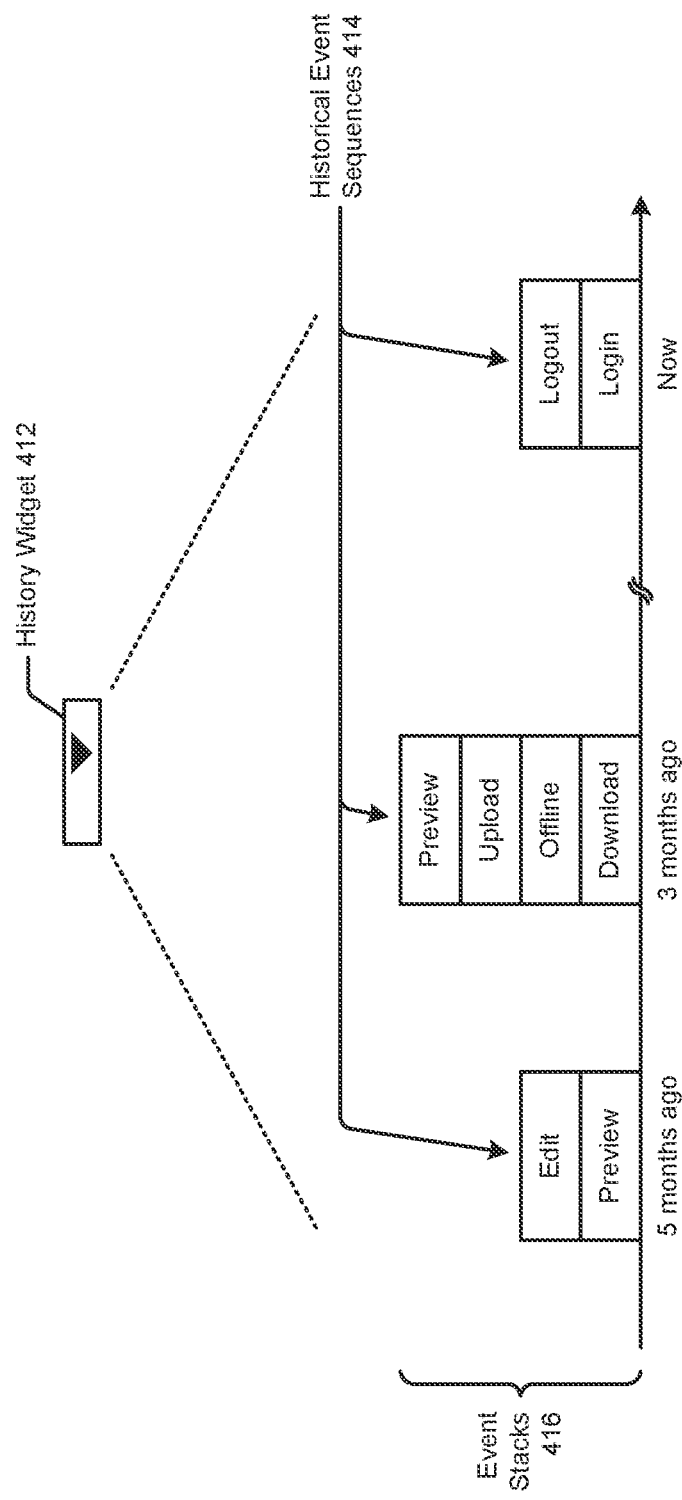

FIG. 4B depicts a second set of example features of an interactive user interface as produced by systems that calculate and report collaboration system risks based on capture and analysis of events on shared objects. As an option, one or more variations of the shown interactive user interface or any aspect thereof may be implemented in the context of the architecture and functionality of the embodiments described herein and/or in any environment.

As shown, when a history widget 412 is expanded, one or more event stacks 416 are displayed. In this example, the event stack shown includes three different event stacks that correspond to three different timeframes. Using the information in the event stacks, an analyst can make judgements based on historical event sequences 414 to assess the specific event-oriented behavior of a particular user. In some cases, a particular user can be deemed to present a vulnerability. In some cases, a particular user can be identified as a source of a data loss or other system breach.

Figure 5:
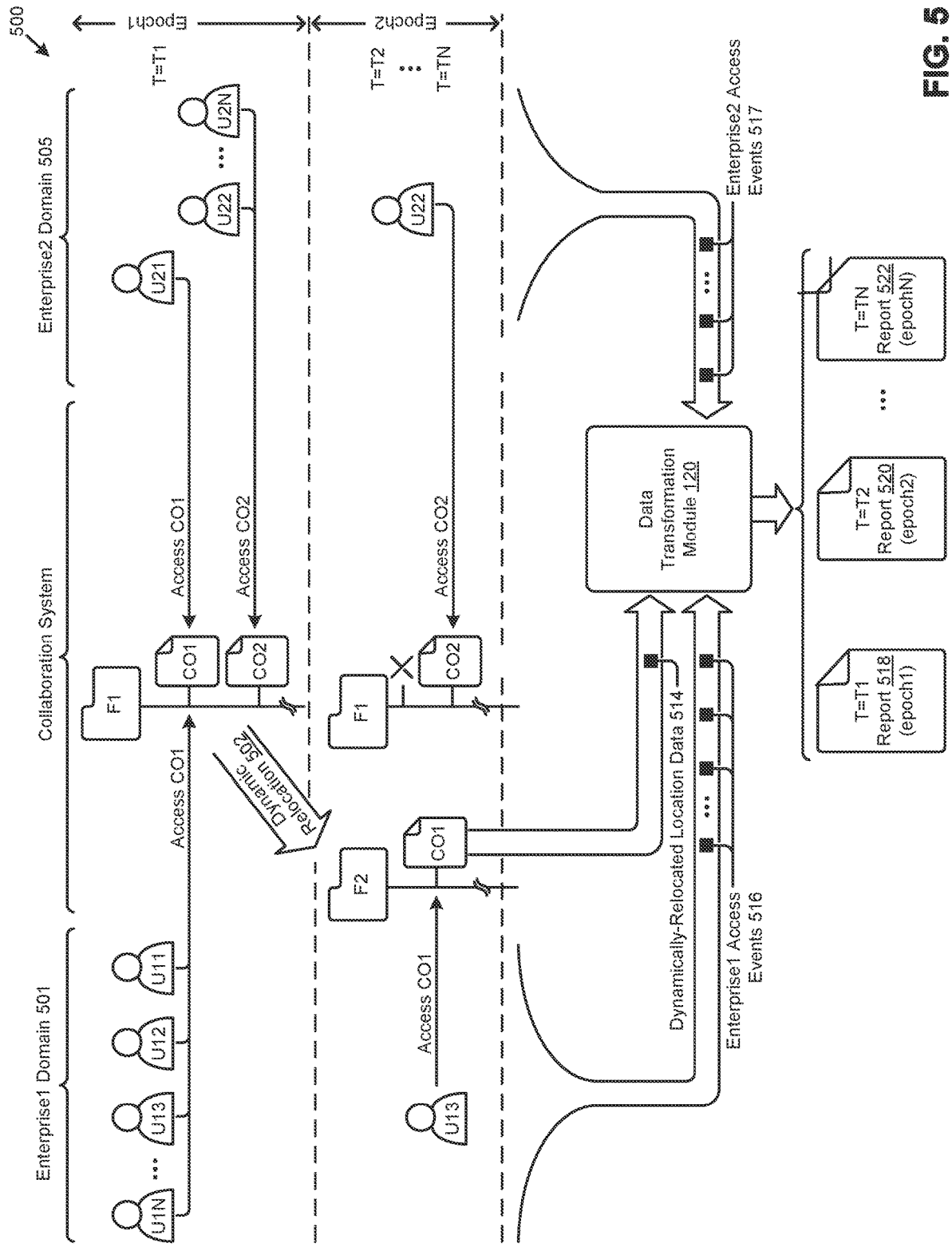
FIG. 5 depicts an example dynamic relocation scenario, according to an embodiment.

FIG. 5 depicts an example dynamic relocation scenario. As an option, one or more variations of dynamic relocation scenario 500 or any aspect thereof may be implemented in the context of the architecture and functionality of the embodiments described herein and/or in any environment.

This figure is being presented to illustrate how changes made to a particular content object of content management system can be managed in a manner that maintains (or revokes) validity (or revocation) of a share link on an ongoing basis. The shown scenario covers situations where may be some relocation of a subject content object itself and/or some relocation of the folder that contains the subject content object.

This example depicts a scenario over multiple time epochs (e.g., epoch1 corresponding to time T=T1, and epoch2 corresponding to time T=T2 through T=TN). Specifically, and as shown as pertaining to epoch1, users (e.g., user U11, user U12, user U13, . . . , user U1N) access content object CO1 from enterprise1 domain 501. Within the same epoch (e.g., between T=T1 and before T=T2) the same content object CO1 is accessed by users from enterprise2 domain 505 (e.g., user U21, user U22, . . . user U2N). It can happen that a user might dynamically relocate content object CO1. In doing so, it is desired that any previously generated shared link URLs that are unaffected by the dynamic relocation remains valid, even after certain acts of dynamic relocation 502 have taken place. To illustrate, and strictly as one example, it might happen that user U13 wants to move content object CO1 such that it is no longer shared with external users (e.g., no longer shared with users of enterprise2). To do so, user U13 can merely move content object CO1 from folder F1 into folder F2. The move operation has the effect of canceling access to content object CO1 by users of enterprise2. Nevertheless users of enterprise1 still have access to content object COL although it is now in folder F2. The content object CO2 remains in folder F1, and the shared link URL to the content object CO2 remains valid.

During time epoch2, the shown data transformation module 120 receives occurrences of dynamically-relocated location data 514 and also continues to receive instances of enterprise1 access events 516 from users in enterprise1 as well as instances of enterprise2 access events 517 from users in enterprise2. As such, a time-specific report (e.g., T1 report 518, T2 report 520, TN report 522) can be generated based on data available at any time within any time epoch.

Additional Embodiments of the Disclosure

Instruction Code Examples

Figure 6A:
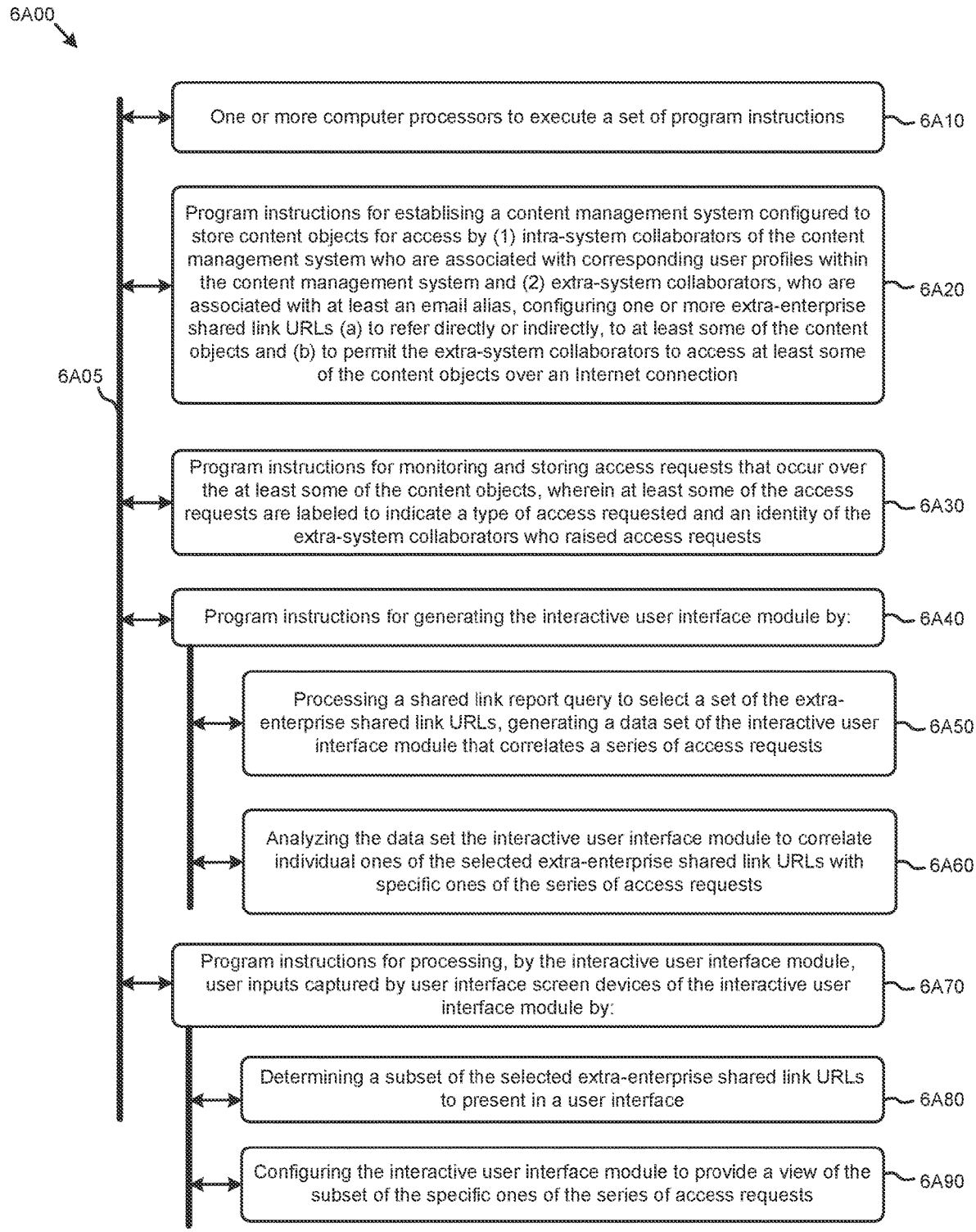
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. This and other embodiments present particular arrangements of elements that, individually or as combined, serve to form improved technological processes that address threat assessments based on human analysis of sharing events becomes incomprehensible as the number of sharing events increases. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment. The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with any other operations over communication path 6A05. The modules of the system can, individually or in combination, perform method operations within system 6A00. Any operations performed within system 6A00 may be performed in any order unless as may be specified in the claims. The shown embodiment implements a portion of a computer system, presented as system 6A00, comprising one or more computer processors to execute a set of program code instructions (module 6A10) and modules for accessing memory to hold program code instructions. Embodiments operate in a content management system configured to store content objects for access by (1) intra-system collaborators of the content management system who are associated with corresponding user profiles within the content management system and (2) extra-system collaborators who are associated with at least an alias, and configuring one or more extra-enterprise shared link URLs (a) to refer directly or indirectly, to at least some of the content objects and (b) to permit the extra-system collaborators to access at least some of the content objects over an Internet connection (module 6A20); monitoring and storing access requests that occur over the at least some of the content objects, wherein at least some of the access requests are labeled to indicate a type of access requested and an identity of the extra-system collaborators who raised access requests (module 6A30); generating the interactive user interface module by (module 6A40); processing a shared link report query to select a set of the extra-enterprise shared link URLs, generating a data set of the interactive user interface module that correlates a series of access requests (module 6A50); analyzing the data set the interactive user interface module to correlate individual ones of the selected extra-enterprise shared link URLs with specific ones of the series of access requests (module 6A60); processing, by the interactive user interface module, user inputs captured by user interface screen devices of the interactive user interface module by (module 6A70); responsive to a first user interface screen device of the user interface module, determining a subset of the selected extra-enterprise shared link URLs to present in a user interface (module 6A80); and responsive to a second user interface screen device of the user interface module, configuring the interactive user interface module to provide a view of the subset of the specific ones of the series of access requests (module 6A90).

Variations of the foregoing may include more or fewer of the shown modules. Certain variations may perform more or fewer (or different) steps and/or certain variations may use data elements in more, or in fewer, or in different operations.

Figure 6B:
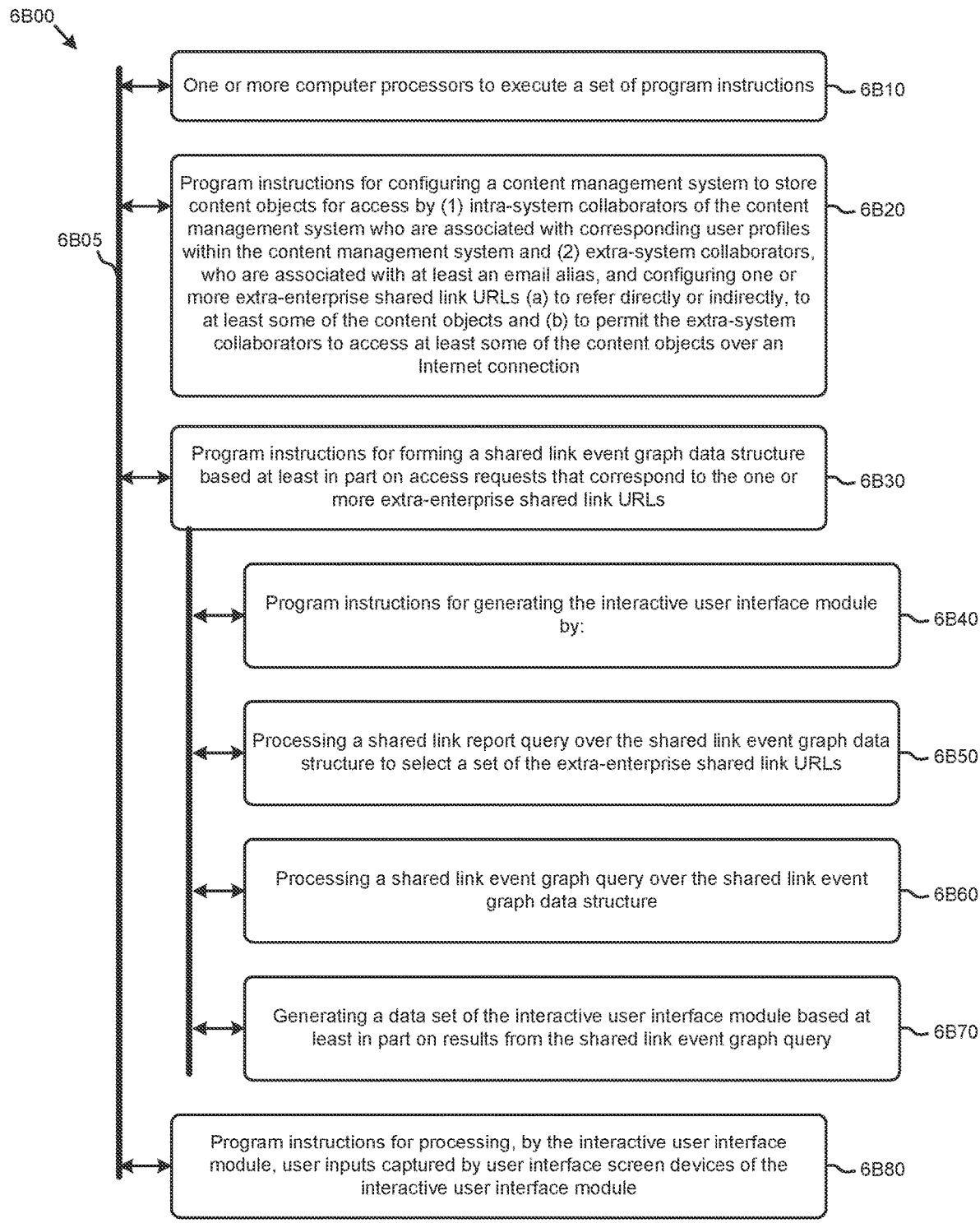

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment. The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with any other operations over communication path 6B05. The modules of the system can, individually or in combination, perform method operations within system 6B00. Any operations performed within system 6B00 may be performed in any order unless as may be specified in the claims. The shown embodiment implements a portion of a computer system, presented as system 6B00, comprising one or more computer processors to execute a set of program code instructions (module 6B10) and modules for accessing memory to hold program code instructions to perform: configuring a content management system to store content objects for access by (1) intra-system collaborators of the content management system who are associated with corresponding user profiles within the content management system and (2) extra-system collaborators who are associated with at least an email alias, and configuring one or more extra-enterprise shared link URLs (a) to refer directly or indirectly, to at least some of the content objects and (b) to permit the extra-system collaborators to access at least some of the content objects over an Internet connection (module 6B20); forming a shared link event graph data structure based at least in part on access requests that correspond to the one or more extra-enterprise shared link URLs (module 6B30); generating the interactive user interface module by (module 6B40); processing a shared link report query over the shared link event graph data structure to select a set of the extra-enterprise shared link URLs (module 6B50); processing a shared link event graph query over the shared link event graph data structure (module 6B60); generating a data set of the interactive user interface module based at least in part on results from the shared link event graph query (module 6B70); and processing, by the interactive user interface module, user inputs captured by user interface screen devices of the interactive user interface module (module 6B80).

Some embodiments include variations in the operations performed, and some embodiments include variations of aspects of the data elements used in the operations.

System Architecture Overview

Additional System Architecture Examples

Figure 7A:
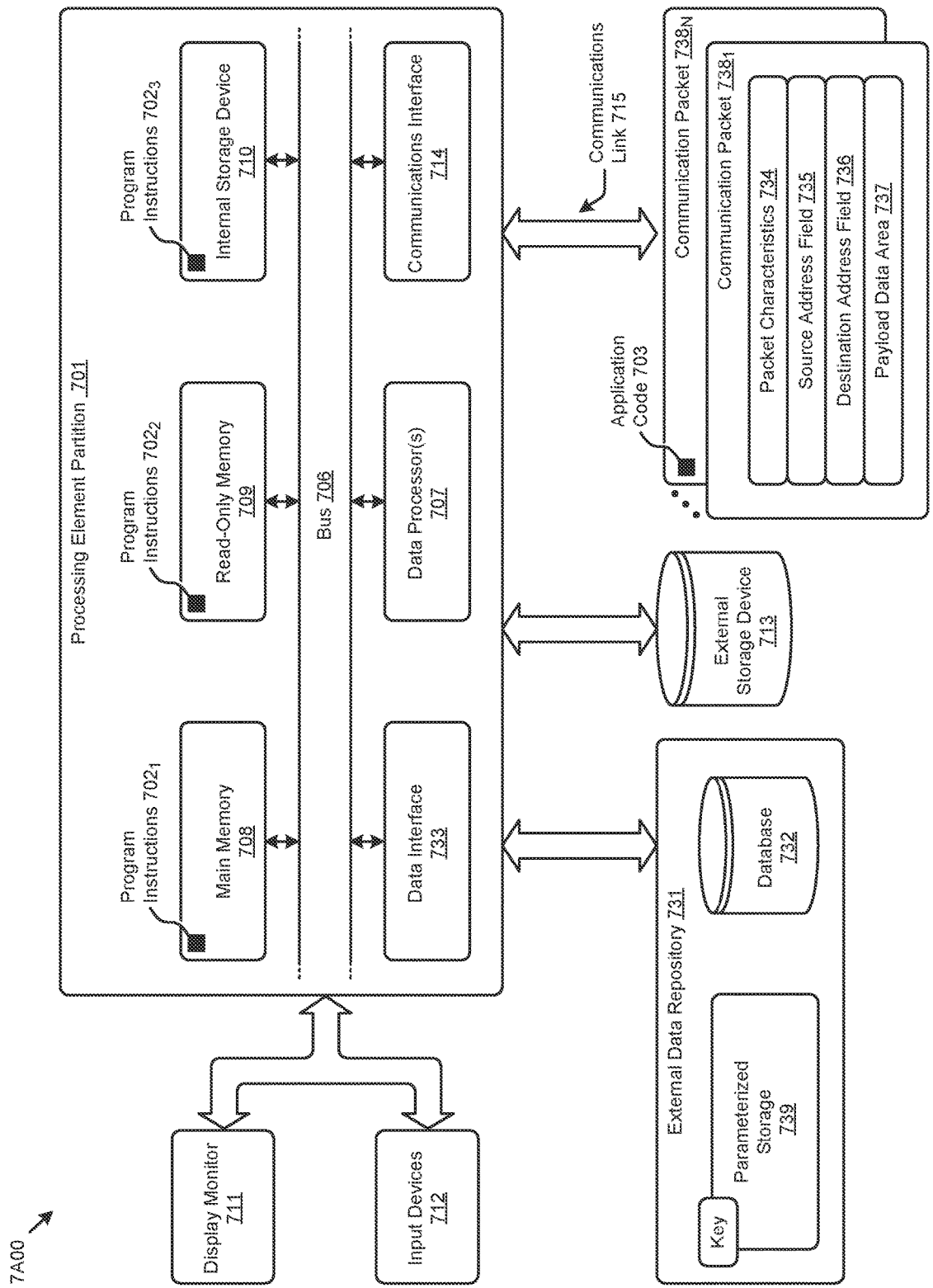
FIG. 7A and FIG. 7B present block diagrams of computer system architectures having components suitable for implementing embodiments of the present disclosure and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. Computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program instructions contained in a memory. Such instructions (e.g., program instructions $702_1$, program instructions $702_2$, program instructions $702_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of communications interface 714 may comprise one or more networking ports that are configurable (e.g., pertaining to speed, protocol, physical layer characteristics, media access characteristics, etc.) and any particular instance of communications interface 714 or port thereto can be configured differently from any other particular instance. Portions of a communication protocol can be carried out in whole or in part by any instance of communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

Communications link 715 can be configured to transmit (e.g., send, receive, signal, etc.) any types of communications packets (e.g., communication packet $738_1$, communication packet $738_N$) comprising any organization of data items. The data items can comprise a payload data area 737, a destination address 736 (e.g., a destination IP address), a source address 735 (e.g., a source IP address), and can include various encodings or formatting of bit fields to populate packet characteristics 734. In some cases, the packet characteristics include a version identifier, a packet or payload length, a traffic class, a flow label, etc. In some cases, payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of a computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

Computer system 7A00 may transmit and receive messages such as data and/or instructions organized into a data structure (e.g., communications packets). The data structure can include program instructions (e.g., application code 703), communicated through communications link 715 and communications interface 714. Received program instructions may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

Processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to calculating and reporting collaboration system risks based on capture and analysis of events on shared objects. A module may include one or more state machines and/or combinational logic used to implement or facilitate the operational and/or performance characteristics pertaining to calculating and reporting collaboration system risks based on capture and analysis of events on shared objects.

Various implementations of database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of calculating and reporting collaboration system risks based on capture and analysis of events on shared objects). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to calculating and reporting collaboration system risks based on capture and analysis of events on shared objects, and/or for improving the way data is manipulated when performing computerized operations pertaining to populating sharing events into an interactive threat assessment tool based on capture and analysis of events on shared objects.

Figure 7B:
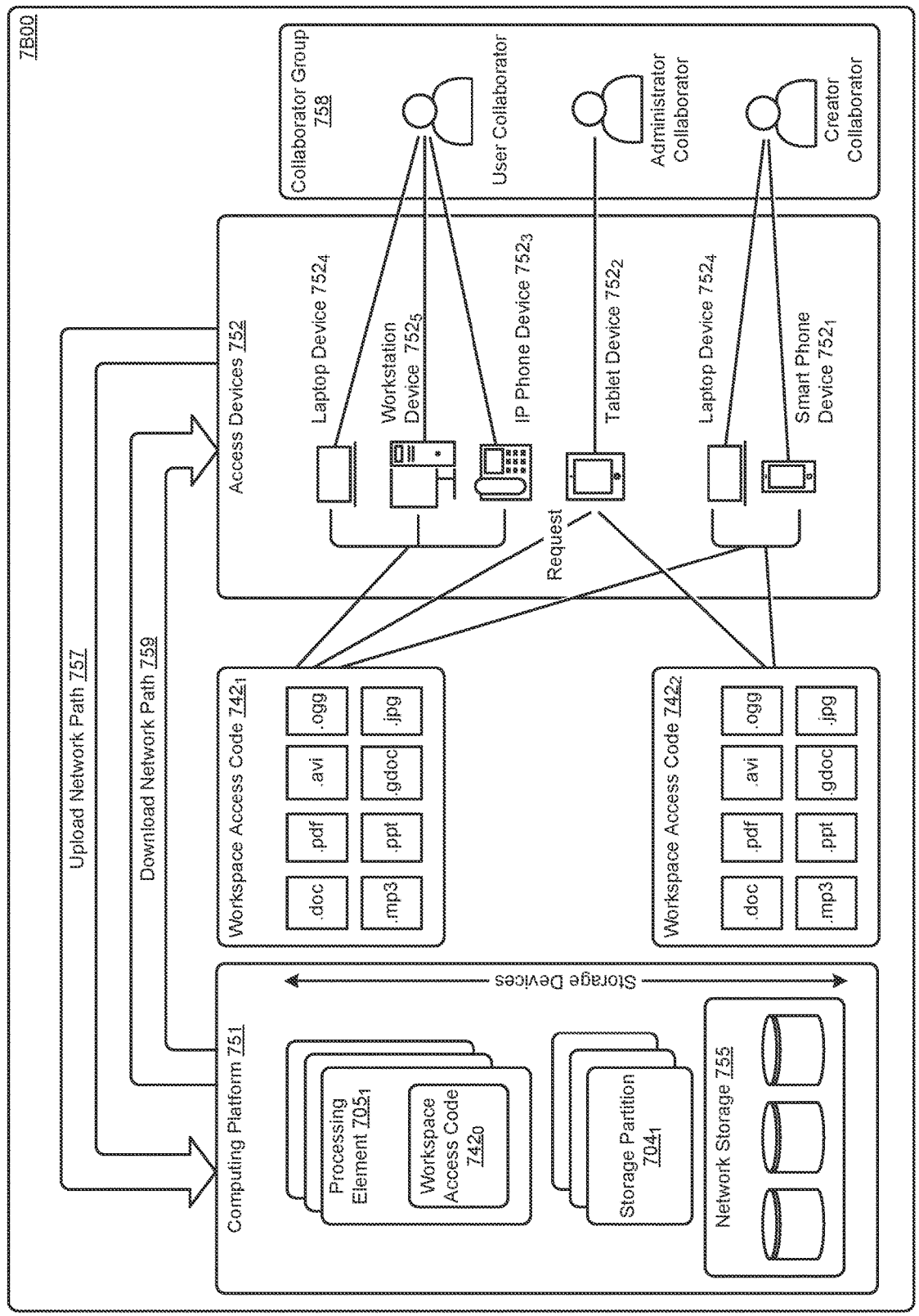

FIG. 7B depicts a block diagram of an instance of a cloud-based environment 7B00. Such a cloud-based environment supports access to workspaces through the execution of workspace access code (e.g., workspace access code $742_0$, workspace access code $742_1$, and workspace access code $742_2$). Workspace access code can be executed on any of access devices 752 (e.g., laptop device $752_4$, workstation device $752_5$, IP phone device $752_3$, tablet device $752_2$, smart phone device $752_1$, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element $705_1$). The workspace access code can interface with storage devices such as networked storage 755. Storage of workspaces and/or any constituent files or objects, and/or any other code or scripts or data can be stored in any one or more storage partitions (e.g., storage partition $704_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for producing an interactive user interface module, the method comprising:
    configuring a content management system to store content objects for access by (1) intra-system collaborators of the content management system who are associated with corresponding user profiles within the content management system and (2) extra-system collaborators who are associated with at least an alias;
    configuring one or more extra-enterprise shared link URLs (a) to refer directly or indirectly, to at least some of the content objects and (b) to permit the extra-system collaborators to access at least some of the content objects over an Internet connection;
    forming a shared link event graph data structure based at least in part on access requests that correspond to the one or more extra-enterprise shared link URLs;
    generating the interactive user interface module by:
        processing a shared link report query over the shared link event graph data structure to select a set of the extra-enterprise shared link URLs;
        processing a shared link event graph query over the shared link event graph data structure;
        generating a data set of the interactive user interface module based at least in part on results from the shared link event graph query; and
    processing, by the interactive user interface module, user inputs captured by user interface screen devices of the interactive user interface module.

2. The method of claim 1, wherein the shared link event graph data structure is continually updated based on further access requests that correspond to the one or more extra-enterprise shared link URLs.

3. The method of claim 1, further comprising responding to the shared link report query by populating a data set that correlates a series of access requests to a set of the selected extra-enterprise shared link URLs.

4. The method of claim 1, further comprising determining a batching strategy to divide the shared link report query into multiple subqueries.

5. The method of claim 1, further comprising applying results from multiple subqueries to a baseline of shared link report query results.

6. The method of claim 1, further comprising creating a guest account for at least one of the extra-system collaborators who accesses the content objects via the extra-enterprise shared link URLs.

7. The method of claim 1, further comprising applying redactions to at least a portion of the access requests prior to population of the data into the data sets.

8. The method of claim 1, wherein the data set of the interactive user interface module includes a listing of which content objects were accessed or downloaded or modified within a specified time period.

9. The method of claim 1, wherein the extra-system collaborators who are associated with at least the alias corresponds to an anonymous user.

10. A non-transitory computer readable medium having stored thereon a sequence of instructions which, when stored in memory and executed by one or more processors causes the one or more processors to perform a set of acts for producing an interactive user interface module, the set of acts comprising:

configuring a content management system to store content objects for access by (1) intra-system collaborators of the content management system who are associated with corresponding user profiles within the content management system and (2) extra-system collaborators who are associated with at least an alias;

configuring one or more extra-enterprise shared link URLs (a) to refer directly or indirectly, to at least some of the content objects and (b) to permit the extra-system collaborators to access at least some of the content objects over an Internet connection;

forming a shared link event graph data structure based at least in part on access requests that correspond to the one or more extra-enterprise shared link URLs;

generating the interactive user interface module by:

processing a shared link report query over the shared link event graph data structure to select a set of the extra-enterprise shared link URLs;

processing a shared link event graph query over the shared link event graph data structure;

generating a data set of the interactive user interface module based at least in part on results from the shared link event graph query; and processing, by the interactive user interface module, user inputs captured by user interface screen devices of the interactive user interface module.

11. The non-transitory computer readable medium of claim 10, wherein the shared link event graph data structure is continually updated based on further access requests that correspond to the one or more extra-enterprise shared link URLs.

12. The non-transitory computer readable medium of claim 10, further comprising instructions which, when stored in memory and executed by the one or more processors causes the one or more processors to perform acts of responding to the shared link report query by populating a data set that correlates a series of access requests to a set of the selected extra-enterprise shared link URLs.

13. The non-transitory computer readable medium of claim 10, further comprising instructions which, when stored in memory and executed by the one or more processors causes the one or more processors to perform acts of determining a batching strategy to divide the shared link report query into multiple subqueries.

14. The non-transitory computer readable medium of claim 10, further comprising instructions which, when stored in memory and executed by the one or more processors causes the one or more processors to perform acts of applying results from multiple subqueries to a baseline of shared link report query results.

15. The non-transitory computer readable medium of claim 10, further comprising instructions which, when stored in memory and executed by the one or more processors causes the one or more processors to perform acts of creating a guest account for at least one of the extra-system collaborators who accesses the content objects via the extra-enterprise shared link URLs.

16. The non-transitory computer readable medium of claim 10, further comprising instructions which, when stored in memory and executed by the one or more processors causes the one or more processors to perform acts of applying redactions to at least a portion of the access requests prior to population of the data into the data sets.

17. The non-transitory computer readable medium of claim 10, wherein the data set of the interactive user interface module includes a listing of which content objects were accessed or downloaded or modified within a specified time period.

18. A system for producing an interactive user interface module, the system comprising:

a storage medium having stored thereon a sequence of instructions; and one or more processors that execute the sequence of instructions to cause the one or more processors to perform a set of acts, the set of acts comprising, configuring a content management system to store content objects for access by (1) intra-system collaborators of the content management system who are associated with corresponding user profiles within the content management system and (2) extra-system collaborators who are associated with at least an alias;

configuring one or more extra-enterprise shared link URLs (a) to refer directly or indirectly, to at least some of the content objects and (b) to permit the extra-system collaborators to access at least some of the content objects over an Internet connection;

forming a shared link event graph data structure based at least in part on access requests that correspond to the one or more extra-enterprise shared link URLs;

generating the interactive user interface module by:

processing a shared link report query over the shared link event graph data structure to select a set of the extra-enterprise shared link URLs;

processing a shared link event graph query over the shared link event graph data structure;

generating a data set of the interactive user interface module based at least in part on results from the shared link event graph query; and processing, by the interactive user interface module, user inputs captured by user interface screen devices of the interactive user interface module.

19. The system of claim 18, wherein the shared link event graph data structure is continually updated based on further access requests that correspond to the one or more extra-enterprise shared link URLs.

20. The system of claim 18, further comprising responding to the shared link report query by populating a data set that correlates a series of access requests to a set of the selected extra-enterprise shared link URLs.

21. The system of claim 18, further comprising determining a batching strategy to divide the shared link report query into multiple subqueries.

* * * * *